US006963291B2

United States Patent
Holforty et al.

(10) Patent No.: US 6,963,291 B2
(45) Date of Patent: Nov. 8, 2005

(54) DYNAMIC WAKE PREDICTION AND VISUALIZATION WITH UNCERTAINTY ANALYSIS

(75) Inventors: Wendy L. Holforty, Mountain View, CA (US); J. David Powell, Half Moon Bay, CA (US)

(73) Assignees: The Board of Trustees of the Leland Stanford Junior University, Palo Alto, CA (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 33 days.

(21) Appl. No.: 10/440,491

(22) Filed: May 15, 2003

(65) Prior Publication Data
US 2003/0222795 A1 Dec. 4, 2003

Related U.S. Application Data
(60) Provisional application No. 60/381,464, filed on May 17, 2002.

(51) Int. Cl.[7] ............................. G08B 23/00; G08G 5/04
(52) U.S. Cl. ...................... 340/945; 340/961; 340/968; 342/29; 73/170.02; 73/178; 701/14; 701/120; 701/301
(58) Field of Search ................................. 340/945, 961, 340/968, 963, 975, 971, 922, 601; 701/14, 120, 301; 342/26 R, 29; 73/170.11, 170.08, 178 T

(56) References Cited

U.S. PATENT DOCUMENTS

| | | | |
|---|---|---|---|
| 4,137,764 A | 2/1979 | Hallock et al. ........... 73/178 T |
| 5,657,009 A | 8/1997 | Gordon ..................... 340/968 |
| 5,724,040 A * | 3/1998 | Watnick .................... 342/26 R |
| 5,838,007 A | 11/1998 | Wang ....................... 250/338.5 |
| 5,845,874 A * | 12/1998 | Beasley ...................... 244/1 R |
| 6,133,867 A | 10/2000 | Eberwine et al. ............. 342/29 |
| 6,177,888 B1 * | 1/2001 | Cabot et al. ................ 340/968 |
| 6,184,816 B1 * | 2/2001 | Zheng et al. ............. 342/26 R |
| 6,384,830 B2 * | 5/2002 | Baron et al. ............... 345/473 |
| 6,480,142 B1 | 11/2002 | Rubin ........................ 342/26 |
| 2002/0075171 A1 * | 6/2002 | Kuntman et al. ........... 340/961 |
| 2002/0089432 A1 | 7/2002 | Staggs et al. ............... 340/945 |

OTHER PUBLICATIONS

ATA, "Airline announce 'top ten' air traffic control priorities," Airline Transport Association (ATA) News Release, Mar. 15, 2001.

(Continued)

Primary Examiner—Donnie L. Crosland
(74) Attorney, Agent, or Firm—Lumen Intellectual Property Services, Inc.

(57) ABSTRACT

A dynamic wake avoidance system utilizes aircraft and atmospheric parameters readily available in flight to model and predict airborne wake vortices in real time. A novel combination of algorithms allows for a relatively simple yet robust wake model to be constructed based on information extracted from a broadcast. The system predicts the location and movement of the wake based on the nominal wake model and correspondingly performs an uncertainty analysis on the wake model to determine a wake hazard zone (no fly zone), which comprises a plurality of "wake planes," each moving independently from another. The system selectively adjusts dimensions of each wake plane to minimize spatial and temporal uncertainty, thereby ensuring that the actual wake is within the wake hazard zone. The predicted wake hazard zone is communicated in real time directly to a user via a realistic visual representation. In an example, the wake hazard zone is visualized on a 3-D flight deck display to enable a pilot to visualize or "see" a neighboring aircraft as well as its wake. The system substantially enhances the pilot's situational awareness and allows for a further safe decrease in spacing, which could alleviate airport and airspace congestion.

22 Claims, 16 Drawing Sheets

OTHER PUBLICATIONS

Belotserkovsky, A., "Preliminary development of the airborne vortex forecasting system," Nov. 2000, Appendix G, "Wake vortex prediction: an overview," Wayne Jackson, ed., Transportation Development Centre, Transport Canada, Mar. 2001.

Jackson, W., "Wake vortex prediction: an overview," TP-136629E, Transport Development Center, Transport Canada, Mar. 2001.

Meyn, L.A., Jan. 12-15, 1998, A new method for integrating uncertainty analysis into data reduction software, Reno, NV, AIAA 98-0632.

Rossow, V.J., "Wake-vortex separation distances when flight-path corridors are constrained," Journal of Aircraft, vol. 33, No. 3, May-Jun. 1996, pp 536-546.

Saleh, M.A., ed., "Airspace and airports: critical issues for the 21st century," Transportation Research Board, A1J05: Committee on Airfield and Airspace Capacity and Delay, 2000.

Rossow, V.j., B.E. Tinlng, Jun. 1988, "Research on aircraft/vortex-wake intensity," Journal of Aircraft, vol. 25, No. 4, pp. 481-492.

Rossow, V.J., J.N. Sacco, P. A. Askins, L.S. Bisbee, and S. M. Smith, Mar.-Apr., 1995, "Wind-tunnel measurements of hazard posed by lift-generated wakes," Journal of Aircraft, vol. 32, No. 2, pp. 278-284.

Rossw, V.J.,R.K. Fong, M.S. Wright and L.S. Bisbee, Mar.-Apr., 1996, "Vortex wakes of tow subsonic transports measured in 80 by 120 foot wind tunnel," Journal of Aircraft, vol. 33, No. 2,pp. 399-406.

Jennings, C., A.K. Barrows, K.W. Alter, J.D. Powell, Oct. 7-13, 2000, "Synthetic vision displays for instrument landings and traffic awareness-development and flight testing," Proceedings of $10^{th}$ DASC, Philadelphia, PA.

Barrows, A.K., P. Enge, B.W. Parkinson, J. D. Powell, Spring 1995, Evaluation of a perspective view cockpit display for general aviation using GPS, NAVIGATION: Journal of the institute of Navigation, vol. 43, No. 1, pp. 55-69.

Alter, K.W., A.K., Barrows, C. Jennings, J.D. Powell, Aug. 1-5, 2000, "3-D perspective primary flight displays for aircraft," Proceedings of Human Factors and Ergonomics Society, San Diego, Ca/.

Jennings, C., K.W., Alters, A.K. Barrows, P. Enge, J.D. Powell, Sep. 1999, "3-D perspective displays for guidance and traffic awareness," Proceedings of ION GPS-99, Nashville, TN.

"Section 3. Wake Turbulence," retrieved on Mar. 20, 2003. Retrieved from the internet: < URL: http://www.2.faa.gov/ATPubs/AIM/Chap7/aim0703.html#7-3-6>.

Meyn, L.A., Jun. 15-19, 1998, "Software tools for measurement uncertainty analysis," Albuquerque, NM, AIAA 98-2713.

Rossow, V. J. et al., "Reduction of uncertainties for prediction of wake vortex location," AIAA 2000-4130, $18^{th}$ AIAA Applied Aerodynamics Conference, Denver, Co, Aug. 14-17, 2000.

* cited by examiner

DYNAMIC WAKE PREDICTION AND VISUALIZATION WITH UNCERTAINTY ANALYSIS

CROSS-REFERENCE TO RELATED APPLICATION

This application claims the benefit of a provisional patent application No. 60/381,464, filed May 17, 2002, the content of which is hereby incorporated herein by reference.

STATEMENT REGARDING FEDERALLY SPONSORED RESEARCH OR DEVELOPMENT

This invention was supported in part by Federal Aviation Administration (FAA) Grant No. 95-G-005. The U.S. Government may have certain rights in this invention.

BACKGROUND OF THE INVENTION

1. Field of the Invention

The present invention relates generally to wake vortex avoidance, and, more particularly, to a self-contained, dynamic wake prediction and visualization system and architecture capable of accurately predicting wake vortices/turbulence and visualizing, via realistic representation, a no fly zone with the certainty that the wake hazard is wholly contained therein.

2. Nomenclature

| | |
|---|---|
| ADS-B | Automatic Dependent Surveillance Broadcast |
| AIM | Aeronautical Information Manual |
| ATA | Air Transport Association |
| ATC | Air Traffic Control |
| AVOSS | Aircraft Vortex Spacing System |
| CTAS | Center-TRACON Automation system |
| FAA | Federal Aviation Administration |
| FMS | Flight Management System |
| GPS | Global Positioning Satellite |
| HUD | Head-up Display |
| IFR | Instrument Flight Rules |
| IMC | Instrument Meteorological Conditions |
| INS | Inertial Navigation Systems |
| LAAS | Local Area Augmentation System |
| MFLAME | Multifunction Future Laser Atmospheric Measurement Equipment |
| MLW | Maximum Landing Weight |
| NAS | National Airspace System |
| NTSB | National Transportation Safety Board |
| OEW | Operational Empty Weight |
| RASS | Radio Acoustic Sounding System |
| TAS | True Airspeed |
| TCAS | Traffic Collision Avoidance System |
| TRACON | Terminal Radar Approach Control |
| VAS | Vortex Advisory System |
| VFS | Vortex Forecast System |
| VFR | Visual Flight Rules |
| VMC | Visual Meteorological Conditions |
| WAAS | Wide Area Augmentation System |

3. Description of the Related Art

Over the coming decades, aviation operations are predicted to continue rising steadily, increasing the burden on already congested and constrained airports and terminal areas. Airspace congestion has led to delays that inconvenience passengers, cost the aviation industry hundreds of millions of dollars each year, and will eventually limit growth. FAA mandated separation distances between aircraft are a major challenge to alleviating airspace congestion. A major factor governing the safe, minimum separation distance is the hazard generated by the wake of a preceding aircraft. Unaware of the proximity of other traffic, en route aircraft may encounter wake turbulence generated by aircraft tens of miles ahead with serious or fatal consequences.

Currently, there is no means in place in the NAS that warns pilots of potential wake vortex encounters in an effective, reliable manner. The need for a warning system is especially critical during the approach and departure phases of flight when aircraft frequently follow in-trail. During VMC, pilots bear the responsibility to maintain a safe distance from other aircraft. This is commonly referred to as "see and avoid". When pilots can see the other aircraft they can estimate the location of the wake, but the dissipation rate of the wake varies from aircraft to aircraft and it is difficult to make an accurate guess. For example, the wake of a Boeing 747 can linger up to 130 seconds in the right atmospheric conditions, whereas the wake of a Learjet may last only 40 seconds in the same conditions. During IMC, controllers are required to keep a certain horizontal and vertical separation between aircraft as the pilot may no longer be able to see the aircraft in front of them. This separation was established to give the atmosphere sufficient time to dissipate or carry the wake out of the path of the following aircraft. The wake is invisible under most atmospheric conditions. In IMC pilots rely entirely on ATC to keep them clear of the wake of the preceding aircraft.

Some general wake avoidance schemes have been proposed, including flight path limiting and multiple glide-path approaches. Unfortunately, these approaches do not convey wake information directly to the pilot, nor provide coverage outside the terminal area of the airport. Some efforts have also been made in altering the aerodynamic characteristics of the aircraft to alleviate wakes or reduce the wake-related hazards. However, while there has been some success in minimizing the wake hazards, the trade-off in modifying the aerodynamic characteristics has generally reduced the performance of the aircraft to an unacceptable level.

Prior art ground-based vortex prediction, detection, and forecasting systems include the Vortex Advisory System (VAS), the Vortex Forecast System (VFS), and the Aircraft Vortex Spacing System (AVOSS). In addition to being inefficient and costly, these prior art systems are only applicable at airports and terminal areas where appropriate equipment has been installed and, in some cases, only in close proximity to the runway.

The Airborne VFS is a proposal based on the research of the VFS. Using real time information about the aircraft, real time and predicted information about meteorological conditions, and real time modeling of vortex transportation and decay, the VFS predicts conditions under which the separation distance between aircraft may be safely reduced below the current standards. In order for the VFS to be implemented operationally, it must be integrated with other systems, such as the AVOSS, that can provide the data on aircraft state and environmental conditions. The Airborne VFS proposes displaying the above information on the cockpit windshield. Unfortunately, since the Airborne VFS is based on a complex set of algorithms and atmospheric measurements, it must be integrated with other ground-based systems and thus cannot be implemented for stand-alone airborne applications.

U.S. Pat. No. 4,137,764, "VORTEX ADVISORY SYSTEM," issued to Hallock et al., discloses a technique for predicting the movement and life expectancy of vortices for the existing meteorological conditions and hence providing safe minimum separation between aircraft approaching a common runway. Hallock et al.'s invention utilizes a wind criterion to determine the required separation. The wind criterion refers to the winds measured, by a network of towers deployed around an airport, with respect to the landing aircraft. Measured wind parameters and safe aircraft separation are displayed to flight control personnel, i.e., ATC, on the ground. Under favorable wind conditions, ATC is given a green light to space arrival traffic closer than the FAA mandated IFR approach spacing.

U.S. Pat. No. 5,657,009, "SYSTEM FOR DETECTING AND VIEWING AIRCRAFT-HAZARDOUS INCIDENTS THAT MAY BE ENCOUNTERED BY AIRCRAFT LANDING OR TAKING-OFF," issued to Gordon, discloses a system, comprised of a ground based system and an aircraft based system, for detecting and viewing aircraft hazardous incidents that may be encountered while landing or taking-off, i.e., in close proximity to an airport runway. These hazardous incidents include aircraft and meteorological phenomena such as microbursts, thunderstorms, tornadoes, and wake turbulence. The wake turbulence is detected by ground detection devices and then positionally and horizontally displayed to the pilot in relation to the flight path of the aircraft.

Another way to detect and measure wake turbulence created by aircraft, particularly jumbo jets landing and taking off on airport runways, is disclosed by Wang in U.S. Pat. No. 5,838,007, "OPTICAL SCINTILLOMETER WAKE VORTEX DETECTION SYSTEM." Wang discloses an optical scintillometer to measure in real time atmospheric wake vortex turbulence intensity up to a distance of ten kilometers. Wang discovered that by measuring the fluctuation of turbulence, rather than the turbulence itself, and by measuring the fluctuation of wind, rather than the cross wind speed itself, meaningful measurements of rates of change of turbulence can be produced to indicate dangerous conditions over a time constant of one second or less.

U.S. Pat. No. 5,845,874, "SYSTEM AND METHOD FOR CREATING VISUAL IMAGES OF AIRCRAFT WAKE VORTICES," issued to Beasley, discloses a method for creating a computer model of wake vortices based on characteristics of the aircraft that is generating them. Environmental and aircraft data are used to compute the position and orientation of the bounds of a wake vortex based on commonly known theoretical and empirical knowledge of wake vortices. The simulated wake vortex is displayed to air traffic controllers or pilots.

U.S. Pat. No. 6,177,888, "WAKE TURBULENCE WARNING AND CAUTION SYSTEM AND METHOD," issued to Cabot et al. and assigned to the Boeing Company of Seattle, Wash., USA, discloses a wake turbulence warning and caution system that alerts a crew member to a potential conflict with the wake of another aircraft only when the system determines that intersection of the aircraft with the wake is about to occur within a predetermined amount of time. The wake tracking unit of the system assumes that the wake terminates at a predetermined distance behind the generating aircraft. In addition, the height and width of the wake volume are assumed to grow linearly with distance behind the aircraft. Cabot et al.'s invention, hereinafter referred to as "the Boeing system," utilizes existing avionics components on larger aircraft and thus can be implemented relatively inexpensively. For example, relative positions of the aircraft and the wake can be displayed on a two-dimensional navigation map display, such as that used in connection with the TCAS aboard an aircraft.

U.S. published patent application Nos. 2002/0075171 A1, "SYSTEM AND METHOD FOR PREDICTING AND DISPLAYING WAKE VORTEX TURBULENCE" and 2002/0089432 A1, "VERTICAL SPEED INDICATOR AND TRAFFIC ALERT COLLISION AVOIDANCE SYSTEM," hereinafter referred to as "the Honeywell system," disclose a hardware implemented method for predicting a trajectory of wake vortex. With an electronic circuit, a current trajectory of a host aircraft is determined as well as whether the current trajectory of the host aircraft intersects the predicted wake vortex trajectory. The position and altitude of the wake generating aircraft, i.e., the intruder aircraft, is determined relative to a local airport. The wake vortex is determined as a function of the intruder aircraft type information such as weight class. The host aircraft determines the intruder aircraft's weight class, rather its actual weight. The Honeywell system relies on the Mode S function of TCAS to determine aircraft identification and, similar to the Boeing system, presents wake information on a two-dimensional TCAS display.

None of the aforementioned prior art systems and methods provides a self-contained, accurate, real-time prediction and three-dimensional visualization of the location and movement of the wake turbulence. More importantly, they do not teach or suggest modeling and visualizing a wake hazard zone with the certainty that the wake is located therein.

SUMMARY OF THE INVENTION

It is therefore a primary goal of the present invention to provide interested parties, e.g., flight crew, ground vehicle crew, ATC, etc. with a real-time prediction and realistic visualization of the location and movement of the wake turbulence of neighboring aircraft relative to the position and movement of oneself and/or of neighboring vehicles. This goal is achieved in a wake vortex avoidance system integrating the dynamic wake prediction and visualization methods and architecture disclosed herein.

According to the principles of the present invention, the system obtains in real time readily available aircraft and atmospheric data from ADS-B message and onboard instrumentation, such as INS and air data computers. Based on essential information extracted from these data, the system constructs a relatively simple wake model. The system predicts the location and movement of the wake based on the wake model and correspondingly determines the uncertainty in the wake prediction. This uncertainty is added to the wake prediction to form the wake hazard zone, which comprises a plurality of "wake planes" each moving independently from the others. The goal of the system is to keep the uncertainty to a minimum, thereby enhancing the accuracy of the wake prediction. The wake prediction, including the wake hazard zone (no fly zone), is communicated in real time directly to a user, such as a pilot, by rendering a realistic visual representation, preferably three-dimensional (3-D), of a neighboring aircraft as well as its wake.

Operational evaluation and flight tests demonstrated that the system accurately maps the no fly zone that wholly contains the dynamic, invisible wake hazard, enables pilots to view potential wake vortex encounters in an effective, reliable manner, and makes it possible to have safe separation distances between aircraft consistently smaller than those currently mandated by the FAA. While the current minimum separation distance standards ensure safety, they have an adverse effect on airport capacity. In addition to enhancing situational awareness of the pilots, the system helps alleviating airport capacity problems without compromising safety.

The wake vortex avoidance system according to the present invention is self-contained, requires no ground-based components, and can be implemented relatively inexpensively for either or both ground-based and airborne applications. Enabling technologies include GPS and ADS-B for determining and broadcasting (air-air/air-ground) the location and position of aircraft. The System comprises a broadcast function and a receive function. The broadcast function delivers in real-time information on the wake and the wake generating aircraft and comprises a GPS receiver and associated components for processing and utilizing the GPS signal; means for assessing and processing the aircraft (ownship) state information including TAS, position, and ground speed; means for calculating wind data; and a data link transceiver and associated components for formulating a broadcast. The receive function receives the broadcast and processes the data to construct a realistic visualization of the wake hazard prediction and comprises a data link transceiver and associated components for receiving and processing the broadcast; a GPS receiver and associated components for processing and utilizing the GPS signal; means for assessing and processing the ownship state information; means for calculating wind data; data processing and flight computer for collecting applicable data and constructing the wake hazard prediction; and a wake visualization device such as a 3-D graphical display.

For ground-based applications, the visualization device may be located in an ATC facility or in ground vehicles in the form of a panel mounted or handheld display. For airborne applications, the display may be located on the flight deck of an aircraft and could be in the form of a panel mounted or handheld display, or a HUD on a helmet, windshield, visor, or other appropriate surface.

In some embodiments, the system requires a universal data link with broadcast and receive capability; a computer capable of assembling data from various sources required for the broadcast and of extracting data from the broadcast message; and a display device capable of rendering 3-D perspective or true 3-D images. The computer is configured with processor-executable program codes implemented in accordance with the present invention for predicting the wake vortex location, movement, and decay based on the available data and constructing a resulting image of a wake hazard zone on the display. The visual presentation of the resulting image may be delivered in a variety of forms and through various vision and display technologies.

Still further objects and advantages of the present invention will become apparent to one of ordinary skill in the art upon reading and understanding the drawings and detailed description of the preferred embodiments disclosed herein.

DETAILED DESCRIPTION

Wake Turbulence and Current Separation Standards

Figure 1:
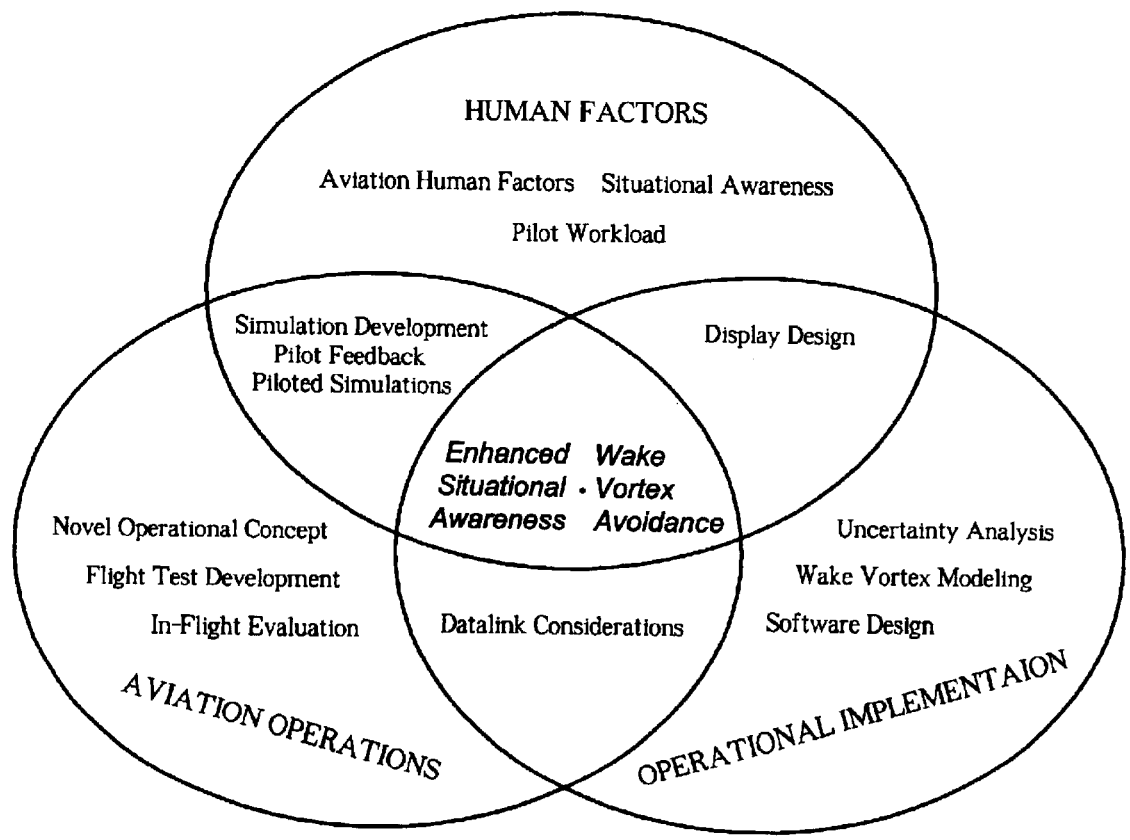
FIG. 1 diagrammatically shows a wake vortex avoidance system and architecture design concept according to an aspect of the present invention.

Airborne wake turbulence is the turbulence that a wing creates in the process of producing lift, which is the result of the difference in air pressure between the upper and lower surface of the wing. A heavier airplane needs more lift, so a heavier airplane generates larger wake turbulence. Interest in the wake turbulence phenomenon increased substantially with the introduction of the larger so called wide-body turbojet aircraft in the late 1960s. Through flight tests, the FAA observed the following:

1) The strength of the wake turbulence is governed by the weight, speed and wingspan of the generating aircraft.
2) The greatest strength occurs when the generating aircraft is heavy, at slow speed with a clean wing configuration.
3) The wake was observed to move down initially and then level off. It was never encountered at the same flight level as the generating aircraft nor more than 900 feet below the generating aircraft.

In 1970, the FAA, NASA, and representatives of the aircraft industry conducted a series of flight tests to establish logical terminal area spacing criteria. The key findings include:

1) Short-spanned aircraft rolled out of the vortices, whereas large-spanned aircraft were pushed out of the vortices. Subsequently, it was assumed that roll would be the obvious result of a wake turbulence encounter for all aircraft.

2) The sink rate of the wake was consistent with theoretical prediction.

It was concluded that a following aircraft can avoid wake turbulence by flying above the flight path of the preceding aircraft. With these findings in mind and recognizing the need for procedures for operations in both IMC and VMC, the FAA published Appendix 1 to Order 7110.29 describing aircraft wake turbulence, vortex strengths, and ATC procedures to provide safe spacing between aircraft. At the same time, they developed the wake turbulence avoidance procedures found in the AIM.

According to NTSB, piloting and ATC procedures used during VMC operations provide the pilot and ATC more flexibility than available during IMC operations. Once the pilot accepts a visual clearance, it is the pilot's responsibility to avoid a wake-turbulence encounter. Separation distances during VMC operations are significantly less than IMC operations. A review of wake turbulence related accidents and incidents in the U.S. shows that there have been no accidents during VMC operations when the pilot flew at or above the flight path of the leading aircraft. Maintaining vertical separation of the follower relative to the leader appears to be the most significant factor for preventing these types of accidents and incidents during VMC operations.

Subsequently, standards for longitudinal wake vortex separation were established to limit the frequency and severity of wake vortex encounters while operating under IFR. Current standards assign aircraft to categories based on weight and then specify a minimum separation distance between aircraft pairs based on their categories. When operating under IFR, controllers are required to keep a certain longitudinal separation between aircraft as the flight crew may no longer be able to see the aircraft in front of them. This separation was established to keep aircraft from encountering the wake of another by giving the atmosphere sufficient time to dissipate the wake or carry it out of the path of the following aircraft. Table 1 shows the current FAA regulated separation distances for IFR at runway threshold. The aircraft are divided into three weight categories based on their respective maximum certificated take-off weight. While these limits ensure safety, they also have an adverse effect on airport capacity.

TABLE 1

| Following Aircraft (Distances in nautical miles) | Lead (Wake-Generating) Aircraft | | | | Weight Range Metric-ton (lbs) |
|---|---|---|---|---|---|
| | Heavy | Boeing 757 | Large | Small | |
| Heavy | 4 | 4 | 3 | 3 | Wt > 115.77 (255,000) |
| Large | 5 | 4 | 3 | 3 | 18.615 < Wt ≦ 115.77 |
| Small | 6 | 5 | 4 | 3 | Wt ≦ 18.615 (41,000) |

There are no specified minimum separation distances during VMC and pilots are given the responsibility to self-separate. Table 2 lists the distances that aircraft have been observed to maintain during self-separation in VMC operations. It appears that pilots tend to fly a little more than 1 nm closer in-trail when they have confidence in the location of the preceding aircraft. There is no reason to believe and no research to support that a wake vortex behaves any differently in IMC than it does in VMC. Therefore, if the same principle that is used in VMC, i.e., the see and avoid rule, is applied to IMC with the aid of a synthetic vision, it should be possible to achieve the same separation distance in IMC operations as in VMC operations without compromising safety.

TABLE 2

| Following Aircraft (Distances in nautical miles) | Wake-Generating Aircraft | | | Weight Range Metric-ton (lbs) |
|---|---|---|---|---|
| | Heavy | Large | Small | |
| Heavy | 2.7 | 1.9 | 1.9 | Wt > 136 (300,000) |
| Large | 3.6 | 1.9 | 1.9 | 5.7 < Wt ≦ 136 |
| Small | 4.5 | 2.7 | 1.9 | Wt ≦ 5.7 (12,500) |

As discussed before, there have been no accidents when FAA wake turbulence regulations and procedures were strictly followed. While there have been a number of accidents and incidents attributed to wake turbulence, these events occur primarily during VMC operations when the pilot is either unaware of the impending danger or is unable to maintain accurate situational awareness and failed to remain above the flight path of the preceding aircraft. As longitudinal separation decreases, vertical positioning of an aircraft relative to the preceding aircraft may provide the greatest potential for preventing wake turbulence encounters. However, since there are no available visual references, avoiding wake turbulence by staying on or above the flight path of the preceding aircraft requires trailing pilots to make certain assumptions on where the leader has flown. Conversely, a graphical display of wake vortices according to the present invention provides the pilot with the necessary information and visual reference to remain above/outside the wake of the preceding aircraft.

Enabling Technologies—GPS and ADS-B

Taking advantages of the state-of-the-art GPS technology, the present invention obtains precise, continuous time-of-arrival measurements and three-dimensional navigational data. For example, with more accurate 3-D positioning, differential GPS, such as the WAAS and LAAS, enables the present invention to display information with accuracies in the meter range and even as low as centimeters. Differential GPS provides the accuracy and integrity necessary for critical flight operations such as flight path following, precision approaches, and wake vortex avoidance. GPS technology enables an aircraft to broadcast, via an airborne datalink such as ADS-B, its horizontal position with an accuracy of approximately 15 m (50 ft) and, when the WAAS becomes operational, to an accuracy of 3 m (10 ft). The broadcast could then be received by other aircraft and used for collision avoidance.

ADS-B is an excellent match with the GPS technology. ADS-B is a datalink system that provides the pilot with the necessary knowledge of airborne traffic, traditionally available only to ATC, without the need for radar or transponder (Mode-S) interrogation. In addition to airborne traffic information, traditionally provided by radar, ADS-B provides access to ground-based traffic information traditionally available only in clear conditions by visual inspection of the airport environment by tower controllers. ADS-B is a passive system that periodically broadcasts its state vector and other information, providing a real-time operational data interface, thus enabling an air-to-air and air-to-ground datalink service. ADS-B provides aircraft identification, three-dimensional position information, ground velocity vector, time of applicability for the message transmitter, and other useful information, depending on the level of functional capability. One of the greatest benefits of ADS-B is that it allows pilots and controllers to have access to the same real-time traffic data.

The hardware for ADS-B can be stand-alone or incorporated within other on-board equipment. ADS-B is automatic, as it requires no external stimulus; it broadcasts without crew intervention or outside interrogation. ADS-B is dependant, because its operation and quality relies on on-board equipment such as navigation and transmission equipment to provide surveillance information. Any user, either airborne or ground-based, within range of the broadcast (~150 nm), can receive and process the ADS-B surveillance information. In some embodiments, the present invention utilizes a United Parcel Service (UPS) Aviation Technologies (UPS AT) Universal Access Transceiver (UAT). The UAT is a radio datalink system operating at 966 MHz which supports, in addition to ADS-B, the Traffic Information Service (TIS-B) and Flight Information Service (FIS-B) broadcast services.

The ADS-B system provides a more accurate account of airborne traffic than conventional surveillance radar and can provide coverage where radar either cannot, such as low altitudes and in mountainous areas, or where radar coverage is limited or does not exist. The digital technology of ADS-B can be made small and light enough for use in general aviation (GA) aircraft which would allow smaller GA aircraft to be equipped with flight deck displays and synthetic vision similar to commercial carriers. With ADS-B, information such as weather, terrain, and traffic can be linked directly to the cockpit for the first time.

Future enabling technologies may include sensor technology. A sensor designed for wake vortex detection must be reliable in all weather conditions, have adequate spatial coverage in three dimensions, have the ability to measure vortex strength or at least detect all hazardous wakes, and have location and tracking accuracy. Vortex sensors must demonstrate accuracy, resolution, and range capabilities sufficient to locate and track a dangerous vortex even under adverse weather conditions. Unfortunately, no one sensor currently meets all the operational needs for wake vortex detection and avoidance, especially for an airborne real-time wake vortex detection system capable of warning the flight crew far enough in advance to allow them ample time to plan an alternate course. At present, as demonstrated by the AVOSS discussed herein, a series or suite of sensors is required for complete coverage. When sensor technology is mature enough for airborne real-time wake vortex detection applications, the present invention can be easily implemented to take advantages of future advances in technology.

A Novel and Practical Airborne Wake Avoidance Concept

Since the 1980s, researchers have been investigating ways to safely reduce spacing between aircraft and increase capacity. As shown in FIG. 1, the present invention provides a balanced approach to solving wake vortex avoidance challenges, integrating human factors considerations, operational implementation, and aviation operations.

Human Factors

Human factors is the science of evaluating and optimizing the relationship between humans and their environment. Placing the responsibility for wake vortex avoidance in the hands of the flight crew is a totally new approach to wake vortex avoidance and requires a thorough understanding of the needs and expectations of the flight crew. These needs and expectations must then be translated into system requirements. The present invention takes into consideration the relationship between the pilot and the display symbology and design, as well as, how the display affects the relationship between the pilot and his environment, e.g., the pilot's situational awareness and workload while using the display.

Operational Implementation

The operational implementation includes wake modeling, uncertainty analysis, and display design. The underlying flight deck display software and hardware as well as the flight computer and instrumentation are based on research conducted at Stanford University. The flight computer is configured with ADS-B datalink software and hardware, which are modified to implement the wake prediction and visualization in accordance with the principles of the present invention. As will be explained in detail in the following sections, the present invention uses only data which is currently or can be made readily available in real-time. Each parameter in the wake model equations is analyzed for uncertainty. The wake model includes this uncertainty in the final prediction and constructs a wake hazard zone, i.e., an area to avoid, rather than the actual wake.

Aviation Operations

The primary requirement is safety. That is, when the wake vortex avoidance system is in use, no wake vortex accident should occur. Another requirement is that wake vortex encounters are infrequent and inconsequential. That is, if unavoidable, a wake vortex encounter shall not result in damage, injury, or death. This translates directly to the accuracy and quality of the wake prediction. With the uncertainties clearly identified and compensated for, the present invention is capable of presenting to the user that the actual wake is somewhere inside the predicted wake hazard zone and that if the user remains outside this zone, there will be no wake vortex encounter and hence no wake vortex accidents.

The Wake Vortex Avoidance System Components and Architecture

Figure 2:
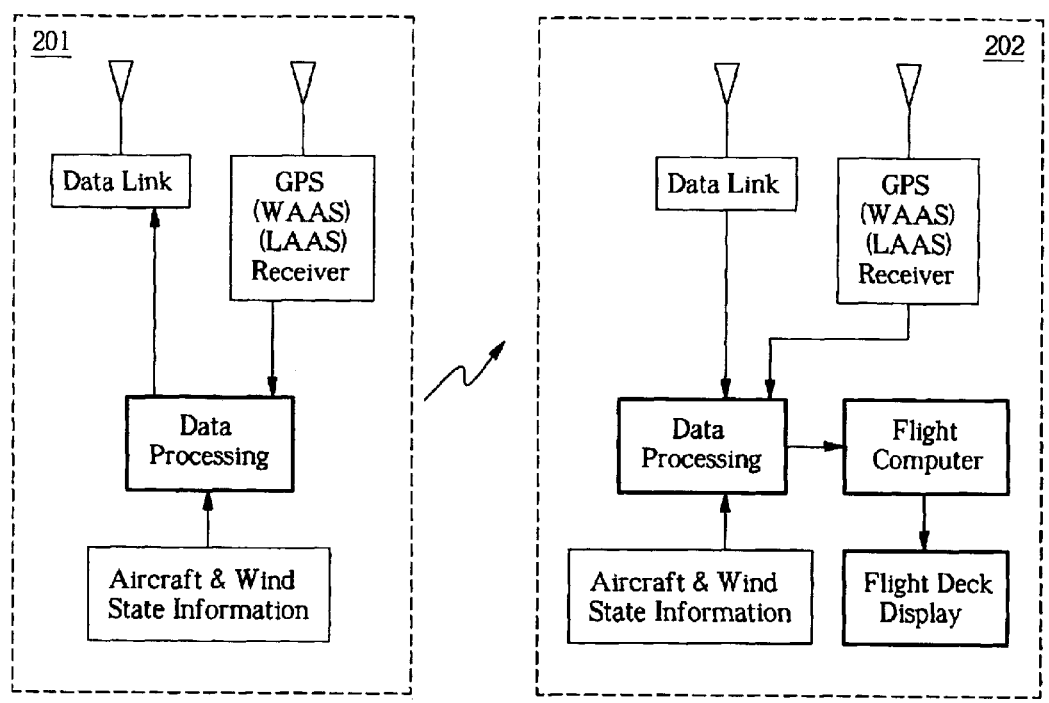
FIG. 2 illustrates an embodiment of the wake vortex avoidance system having a broadcast side and a receive side.

The system is self-contained and requires no ground-based components. In an exemplary embodiment shown in FIG. 2, it is comprised of a broadcast unit 201 and a receive unit 202. The broadcast unit 201 gathers the aircraft state and status as well as atmospheric conditions from various other components that already function as part of the aircraft systems, such as the Flight Management System (FMS), GPS, and air data computer, etc. The broadcast unit 201 packages this information into a datalink packet and broadcasts it. The receive unit 202 receives the broadcast and processes the datalink packet thereof.

Figure 3:
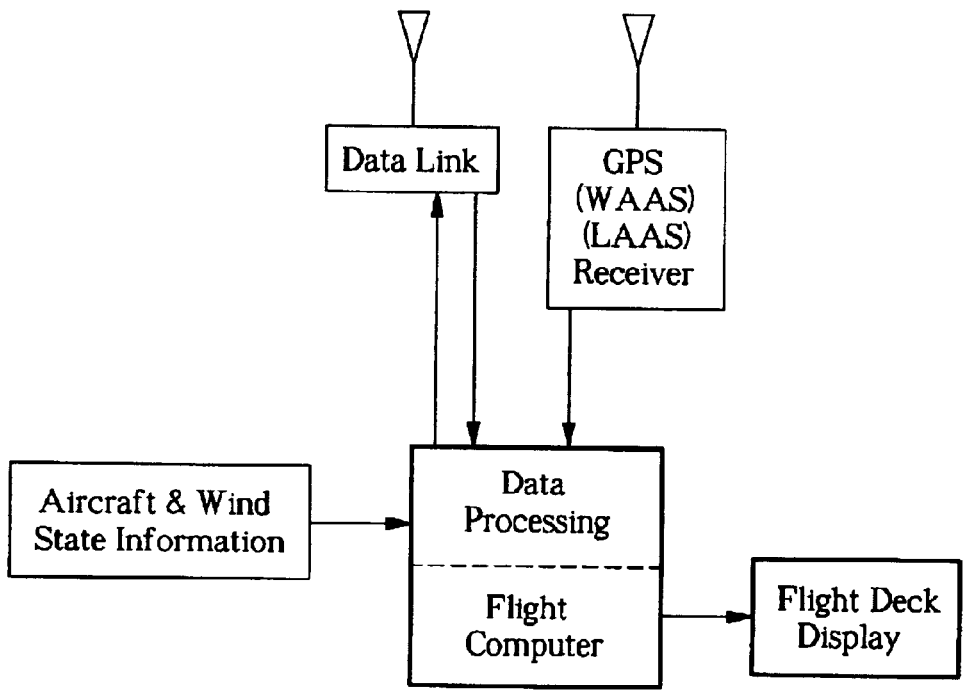
FIG. 3 illustrates an embodiment of the wake vortex avoidance system having integrated broadcast/receive architecture.

The receive unit 202 can be implemented in various locations. For example, a receiving aircraft would use the same instrumentation to calculate its own position and movement and then display the relative positions and wake of broadcasting (neighboring) aircraft. For ground-based applications, such as in ATC facilities, only the receive unit would be necessary. For airborne applications, each aircraft would preferably have a combined architecture 300 as shown in FIG. 3 so that it could not only receive data from neighboring aircraft, but also broadcast its own state. However, small aircraft whose wake is not a significant hazard could reduce cost by optionally carrying only the receive unit.

To minimize uncertainty, the aircraft position and velocity with respect to the ground would come from a GPS (WAAS, LAAS) receiver and the TAS, wind vector, and air density would come from an air data computer. The weight of the aircraft is a function of the operational empty weight, passengers, cargo, and fuel. Of these, only the fuel causes a change in the weight over the duration of the flight. Fuel burn is normally calculated by on-board instrumentation and the real-time weight of the aircraft could be calculated from the fuel burn. Ideally, the TAS, wind vector, air density, wingspan, and real-time weight would be a part of the datalink message. If any of this information is not part of the data link message, it would have to be estimated on the receive side, adding uncertainty to the wake prediction. If the weight and wingspan are not part of the data link message, the aircraft type could be determined from the Mode-S transmission and a table look-up would be used on the receive side to estimate these two values. If the wind vector or air density is not part of the message, then the receiving aircraft would have to use the winds and air density as determined by its own on-board instrumentation. Estimating these values would also add to the uncertainty of the wake prediction.

In some embodiments, the system requires that aircraft be equipped with: a universal datalink with a common broadcast and receive capability; a flight computer capable of assembling data for broadcast from various onboard instrumentation and extracting data from the broadcast message received; and a display device. The flight computer must be configured with software necessary for constructing a wake model based on the extracted data, for predicting the wake vortex location, movement, and decay based on the model, for analyzing and reducing uncertainties in the model, and for rendering the optimized prediction including the wake hazard zone on the display device.

Wake Terminology and Theories

In order to model the wake vortex of the generating aircraft on a flight deck display, the ownship must know the characteristics of the neighboring aircraft and/or its wake. One way to model the wake hazard is to have aircraft equipped with onboard sensors and actually measure the wake vortices and then use these measurements to display the wake. As discussed before, no reliable, all weather, low cost, operational wake vortex sensors are presently available. Although pulsed lidar has been used for the direct detection of turbulence 15–30 seconds ahead of an aircraft, the state of the art of on-board instrumentation has not yet reached a level where sensing or measuring the wake in-flight is practical and the cost of outfitting aircraft with these sensors could be prohibitive. Even if such on-board sensors were on the ownship, that aircraft would have to be in or very near the wake to sense its location, which, precisely, is the location the ownship should avoid. A more viable way to model the wake hazard is to predict the wake using mathematical models.

Mathematical modeling of wake vortices is extremely complex because it is dependent upon the aerodynamic characteristics of the wake-generating aircraft, ambient atmospheric conditions, the proximity of the wake-generating aircraft to the ground, and the time elapsed since generation. The wake model according to the present invention simplifies the traditional modeling techniques without compromising accuracy. The equations disclosed herein use parameters readily available from onboard instrumentation and air-to-air/ground-to-air datalink such as ADS-B. The parameters are explained in the following section with reference to FIG. 4.

Wake Vortex Characteristics and Terminology

Wake vortices are the predominant part of aircraft wake turbulence and their rotational force or vortex strength is dependent on wing loading, gross weight, and airspeed of the generating aircraft. Wake vortex encounters occur most frequently during the approach and landing phase of flight below 1000 ft, sometimes during cruise, and occasionally while taking-off, climbing, or descending. The wake hazard of an aircraft is characterized by a pair of counter-rotating vortices, cylindrical in shape, that originate at the wingtips of an aircraft generating lift. Sometimes referred to as wing tip vortices, they are a byproduct of finite-span lifting wings and are created from the pressure differential between the upper and lower surfaces of the wing. In an attempt to equalize the pressure between the upper and lower surfaces, the higher pressure from below rolls up into the lower pressure above and flows off the wing. This flow establishes a circulatory motion which trails downstream of the wing. This area behind the aircraft is where wake turbulence is encountered.

Figure 4:
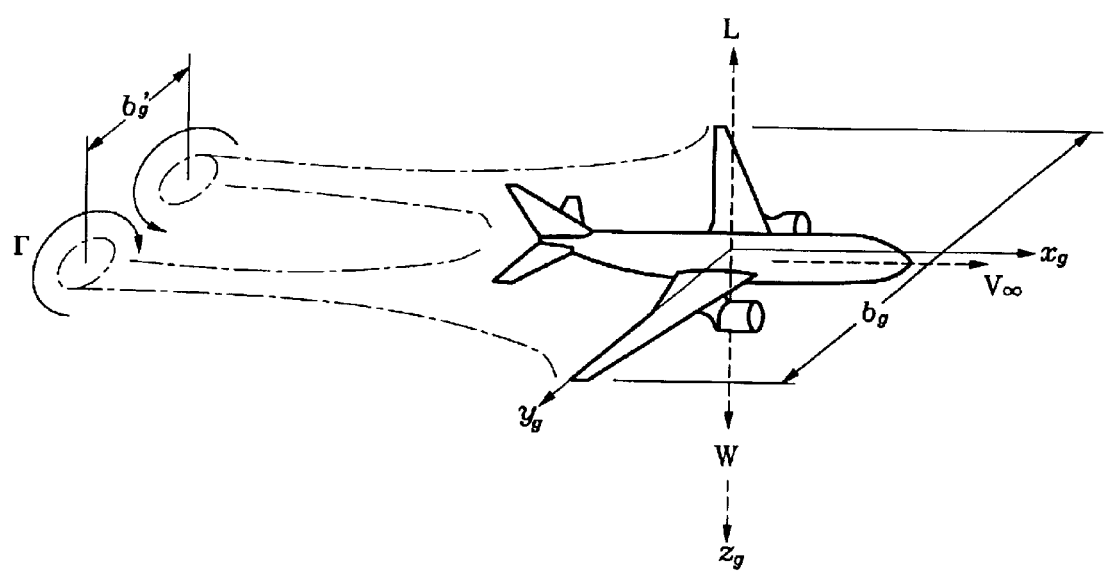
FIG. 4 illustrates the wake vortex terminology according to the present invention.

Referring to FIG. 4, $b_g$ is the wingspan; $b'_g$ is the wake vortex span, i.e., the distance between the centers of the two counter-rotating vortex cores; L is the lift generated by the wings; W is the weight of the aircraft; and $V_\infty$ is the freestream velocity or true airspeed. In unaccelerated flight the force of lift equals that of weight. Since lift is not easily determined during flight, weight is substituted for lift in the following example. The general flow field of the vortex is roughly circular and its dimensions depend on the wingspan, configuration, and angle of attack of the generating aircraft. The circulation, $\Gamma$, of each vortex of a vortex pair is often referred to as the vortex strength. The vortex strength is a function of the aircraft's lift and velocity, the span of the vortex cores, and the air density.

Figure 5:
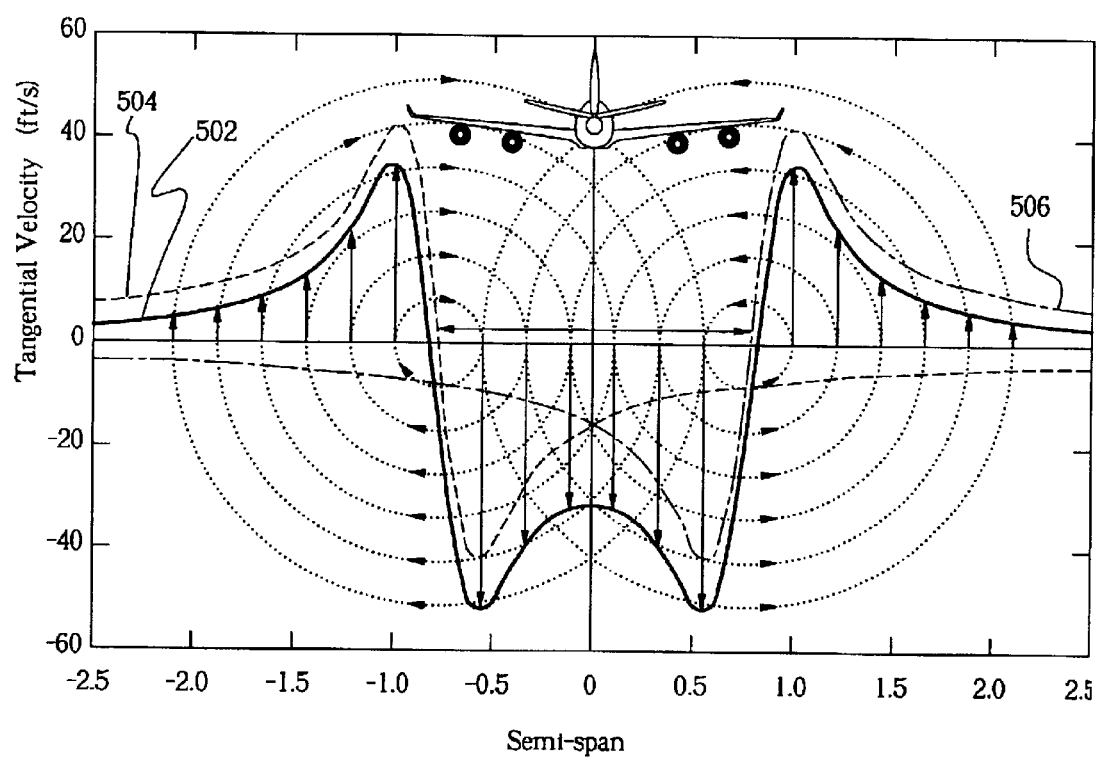
FIG. 5 profiles calculated tangential velocity of a pair of wake vortices.

The initial separation of the two vortex cores is proportional to the wingspan. The size of the vortex core can range from a few inches to several feet depending on the size of the generating aircraft. The outer region of the vortex is characterized by a decreasing tangential velocity profile that ranges from less than 10 ft/s at the edge to as much as 450 ft/s near the core depending on the size of and the distance aft of the wake-generating aircraft. The maximum tangential velocity occurs near (but not at) the vortex center. FIG. 5 is a diagram of the calculated tangential velocity profile of a pair of vortices, assuming a Rankine-vortex pair, for a Boeing 747-400 at gross take-off weight. In FIG. 5, line 502 is a superposition of starboard and port vortices, line 504 represents port vortex, and line 506 represents starboard vortex. As can be seen in FIG. 5, because the circulation $\Gamma$ of each vortex in a wake-vortex pair is equal in magnitude and opposite in rotational direction, the center of each vortex is in the field of velocity induced by the other. Therefore, in the absence of atmospheric effects, the vortices move downward by mutual induction with equal uniform velocity. The motions of wake vortices will be explained with more details in the following sections.

Flight tests reveal that the cleaner the aircraft configuration, the more ordered the vortex flow, the smaller the field of influence, the more persistent the vortex, and the higher the peak tangential velocities. Vortex systems were found to dissipate more rapidly after descending into ground effect, even under low ambient wind conditions. For identical vortex ages, the tangential velocity appears to drop-off when they are generated close to the ground. Aircraft with fuselage mounted engines had been found to have high tangential velocities even in the landing configuration, i.e., the decay and dispersion rates of wake vortices are quite slow. As one skilled in the art would know, wake vortices change very little for about 40 wingspans behind the generating aircraft and vortex structure could be approximated using simple inviscid theory.

Wake Turbulence Behavior—Out of Ground Effect (OGE)

As discussed before, in the absence of atmospheric effects, the vortices move downward by mutual induction with equal uniform velocity. For example, in the absence of wind, the wake descends directly behind and in-line with the flight path of the generating aircraft. In the presence of the wind, the wake will drift off the flight path in the direction of the wind at roughly the same velocity. Even in the presence of wind, the wake nonetheless remains coherent as a vortex pair. In general, the wake tends to descend behind the generating aircraft for 500–1500 ft at which point it levels off and remains until it dissipates. The point at which the wake levels is dependant on the strength of the mutual induction and atmospheric conditions, which will be discussed further in the later sections.

From observing aircraft condensation trails, it can be seen that the wake trail tends to spread out with time t, approximately $t^2$. However, the rate at which the wake spreads has not been established through either ground-based simulation or flight tests. Relevant teachings can be found in "Overview of Wake-Vortex Hazards During Cruise," Rossow, V. J., James, K. D., AIAA *Journal of Aircraft*, Nov/Dec 2000, pp. 676–695, and "Reduction of Uncertainties for Prediction of Wake Vortex Location," Rossow, V. J., AIAA 2000–4130, 18th AIAA Applied Aerodynamics Conference, Denver, Colo., 14–17 Aug. 2000.

Aircraft with flaps extended, as on approach, produce multiple vortex pairs that persist as distinct vortices for some time after the passage of the wake-generating aircraft. In the simplest case, the aircraft generates tip vortices at the wingtips and flap vortices of lesser strength at the outboard edge of the inboard flaps. The horizontal tail surface also produces a vortex pair. The two pairs of co-rotating vortices from the wing and the counter-rotating pair from the horizontal tail form a basic flaps-down vortex system, which would remain intact for several wing-spans behind the wake-generating aircraft and then rolls up into the classic counter-rotating vortex pair. The flaps-down vortex system is less stable and the instabilities associated with this system grow more rapidly than the clean vortex pair.

Wake Turbulence Behavior—In Ground Effect (IGE)

In addition to the vertical motion of the wake due to mutual induction and the influence of the wind as described above, the vortices are also influenced by ground effect. This influence is a complex phenomenon and has been the focus of a number of researchers. Just as at altitude, the descent and lateral transport of wake vortices is affected by vertical gradients in the atmosphere. For instance, non-linear shear can reduce the descent rate of a wake, cause it to stall or even rise. No-wind conditions in the terminal area are relatively rare and the wind patterns in the airport environment are quite complicated due to interactions with the surface, buildings, and other structures near the runway environment. The combination of wind and other atmospheric dynamics and ground effect make predicting and modeling wake vortices in ground effect a complex endeavor. A qualitative understanding of vortex transport mechanisms in ground effect is well documented. Quantitative relationships, however, are not yet well understood and a model that incorporates the relevant factors of ground effect including wind, runway configuration, and wake lifespan is required. Although ground effect is known to enhance wake turbulence decay, degree of such enhancement is unknown.

Figure 6:
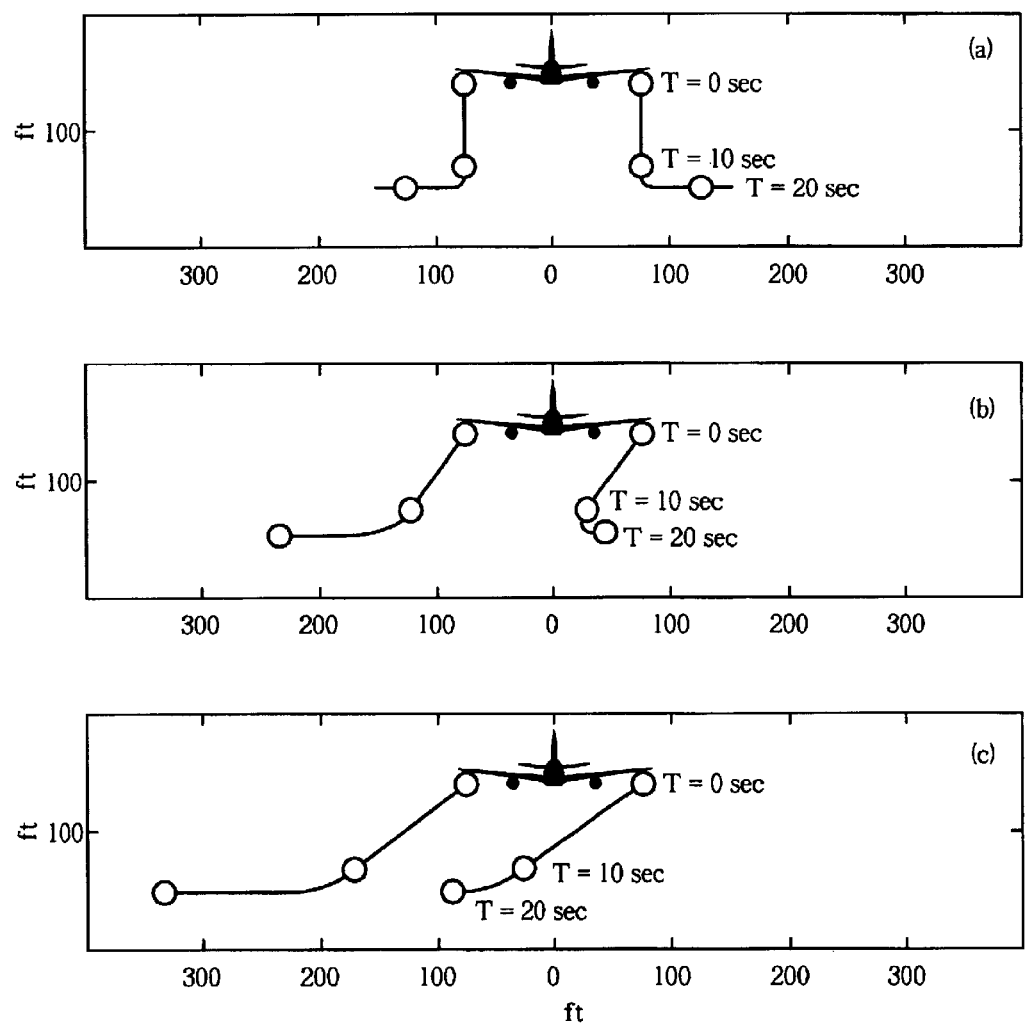
FIG. 6 exemplifies in ground effect on wake vortices.

Within the terminal area, vortices are transported with the wind as a pair until they have descended to an altitude of about 1 to 1½ b' when they begin to experience ground effect. The downward motion then redirects the vortex to a path parallel to the ground at a speed equal to the sink rate. Once in contact with the ground the wake begins to move across the surface. When there is no wind (or at least no crosswind component to the wind), the two counter-rotating vortices will move in opposite directions away from the runway environment as shown in FIG. 6(*a*), with a 0-knot crosswind at time T=0, 10, and 20 seconds, respectively. When the crosswind component of the wind is between roughly 1 to 5 kts (around the value of the sink rate), the upwind vortex will remain or stall over the runway causing a hazard to aircraft operating on that runway as exemplified in FIG. 6(*b*), with a 3-knot crosswind. The downwind vortex, however, will quickly exit the runway environment, but may easily be blown onto a parallel runway. If the crosswind component is greater than 5 kts, both vortices will move to the leeward side of the runway and may blow onto a parallel runway as shown in FIG. 6(*c*), with a 6-knot crosswind. Wake vortices are known to be extremely sensitive to low-level wind conditions, including vertical velocity gradients, although some existing theories can predict the approximate behavior of vortices near the ground. Nevertheless, as known in the art, the location of wake vortices in ground effect cannot be accurately predicted on the basis of routine wind data as reported by tower controllers.

Atmospheric Effects and the Decay Process

Since the air pressure, temperature, and air density vary with altitude, the atmosphere is stratified vertically. Vertical motion within the atmosphere is hindered when the stratification is stable. An unstable stratification, however, intensifies vertical motion and atmospheric mixing and turbulence occurs. In addition to vertical motion due to atmospheric stratification, there is vertical motion due to thermal activity, up- and downdrafts, and wind shear. As a result, the decay and motion of wake vortices in the atmosphere is a complex process.

The initial behavior of wake turbulence is well documented and described in theory. The far-field characteristics, however, are not well understood and are strongly dependent on meteorological conditions. The most significant challenge to the modeling and prediction of wake vortices is the determination of the effects of the atmosphere on the motion and decay of the wake. As the wake descends through the atmosphere, it may experience laminar and turbulent viscous interactions, buoyancy forces, wind shear, turbulence, and other atmospheric effects. Atmospheric turbulence tends to extract energy from the vortices by dispersing the vortex strength. The more turbulent the atmosphere, the faster the wake decays to a non-hazardous state. Under calm conditions, however, wake turbulence has been observed to exist for distances far greater than the FAA required IFR spacing.

There is a strong correlation between wake lifespan and atmospheric turbulence. The life of the wake is dramatically shortened by even small amounts of atmospheric turbulence. There is also a correlation of wake lifespan with the lapse rate, but the effect is weak if the atmospheric turbulence level is fixed. The vortex spacing remains relatively unchanged during the descent of the wake, with a small increase in spacing being conceivable.

The Wake Vortex Hazard

The hazard of wake turbulence is well documented and has been the subject of intense research for over 40 years. The danger of wake vortices comes not so much from the wake itself, but from the fact that it cannot be seen and encounters occur without warning. Wake vortex encounters occur most frequently while aircraft are flying in-trail on final approach where aircraft are flying low and slow. The relatively narrow corridor occupied by aircraft on approach to land usually has a high concentration of traffic flying along roughly the same flight path. Each one in turn deposits its wake in front of another along that path.

Figure 7:
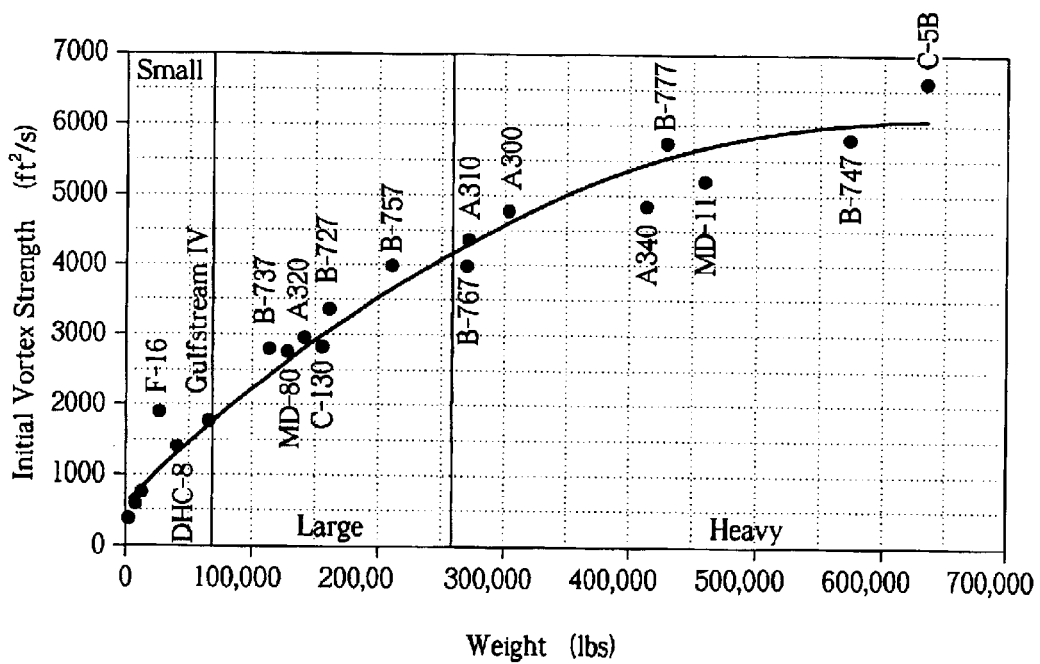
FIG. 7 shows the relationship between the weight of an aircraft and its initial vortex strength.

A wake vortex encounter could result in a mild disturbance or a catastrophic upset. The degree of upset depends mainly on the relative sizes of the generating and encountering aircraft. Both the initial strength of the vortex and the resulting response to the encounter are directly related to the size and weight of both aircraft involved. FIG. 7 shows the relationship between the maximum landing weight of an aircraft and its initial vortex strength at approach airspeed and sea level air density. Although wake vortices induce pitching, yawing and lifting motions, as well as large structural loads on the encountering aircraft, the most hazardous region is near the center of a vortex, when flying in-trail, where the encountering aircraft experiences an overpowering rolling moment.

Thus, wake vortex encounters are particularly hazardous in the terminal area during take-offs and landings where there is a high concentration of aircraft flying low and slow. The probability of a wake encounter is reduced as the in-trail spacing between aircraft is increased. Under conditions of negligible atmospheric turbulence (calm conditions), the wake may stall in the approach corridor. The current FAA wake vortex avoidance procedures were developed based on these conservative meteorological conditions. Under most meteorological conditions, though, the wake is quickly transported out of the approach corridor or decays at a relatively fast rate due to atmospheric instability, as discussed before.

The in-trail hazard is associated with the fact that the wake-induced rolling moment of the generating aircraft can exceed the roll control authority of the encountering aircraft. When rating the relative hazard of the encounter, pilots cited their proximity to the ground as the primary factor. In some cases, upsets as small as 7 degrees in bank angle were considered to be hazardous at an altitude of 200 ft (61.0 m) for IFR operations and at 50 ft (15.2 m) for VFR operations. For the purposes of this disclosure, wake turbulence is considered hazardous if it causes an uncontrollable upset or flight-path excursion, or requires an aircraft to deviate from the normal flight-path or approach (such as in a go around) in order to ensure safety or maintain control of the aircraft.

Figure 8:
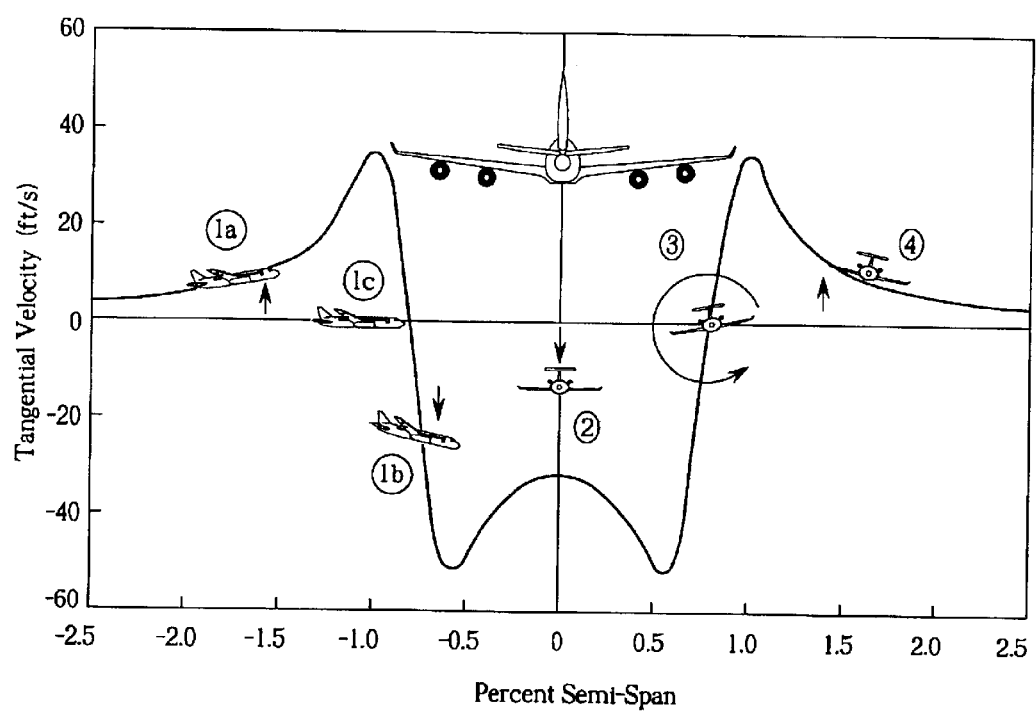
FIG. 8 illustrates en-route wake turbulence encounter scenarios at cruise altitudes.

At cruise altitudes, wake turbulence poses a hazard for both the in-trail and cross-trail encounters. En-route aircraft tend to fly along the same airways between airports and waypoints and they may find themselves in-trail behind other aircraft, while at the same time crossing the paths of aircraft on intersecting airways. FIG. 8 illustrates the following possible en-route encounter scenarios:

1. The aircraft traverses across the wake trail and encounters structural loads that may exceed the structural design limits of the aircraft. The aircraft is pushed initially up by the upward moving air on the outer edge of the wake (a) and then down as it crosses into the downward moving air on the other side (b). The greatest structural loads will be encountered by traversing perpendicular to the vortex trail and in-line with the vortex cores (c).
2. The aircraft penetrates the vortex in-trail between the two vortex cores and encounters the downwash of the wake-generating aircraft. The aircraft may experience an uncontrollable lose of altitude or decrease in rate of climb.
3. The aircraft penetrates the vortex in-trail and aligned with the vortex core. The encountering aircraft experiences an over-powering rolling moment, which can exceed the roll control authority of the encountering aircraft.
4. The aircraft encounters the wake in-trail, but off center from the vortex core. The upward moving air on the outer edge of the wake pushes up on the wing clipping the vortex and the induced roll tosses the aircraft out of the wake.

At altitude, wake vortices tend to descend below the flight-path of the wake-generating aircraft. Because aircraft flying along the same airway and in the same direction are restricted to certain altitudes that are 2000 feet apart, they rarely encounter in-trail wakes. The most likely en-route encounter is that of a cross-trial encounter in those locations where multiple airways intersect. In addition, wakes are present for much longer periods of time at altitude and have sufficient time to be influenced by atmospheric conditions and self-induced instabilities. The slowly spreading downwash (self-induced decent velocity) creates a vertical loads hazard to encountering aircraft. It has been observed, via condensation trails, that mutually-induced instabilities begin after only a few seconds and that about 2–5 min are required for these instabilities to render a wake vortex incoherent and non-hazardous for in-trail encounters. It takes on the order of tens of minutes, however, for a wake to spread sufficiently to become non-hazardous to cross-trail encounters, which means a vertical loads hazard to crossing aircraft may exist long after the in-trail hazard.

Since condensation trails exist only under certain favorable atmospheric conditions, the wake is most likely invisible. The flight crew may be unaware of crossing or neighboring traffic (within 200 miles). A wake turbulence encounter at altitude may be mistaken for clear air turbulence (CAT), but is distinguishable by strength and duration. CAT usually lasts for minutes to hours and feels like driving on a bumpy road, whereas a cross-trail encounter is usually abrupt, lasting only seconds. An aircraft crossing the wake of another larger aircraft may experience severe vertical loads that exceed the design limits of the traversing aircraft.

To date, en-route wake turbulence encounters have been few. The number of encounters may increase, however, with the implementation of the Reduced Vertical Separation Minima (RVSM) program and the introduction of Free Flight. In an effort to address airspace capacity issues, the FAA proposes to reduce the vertical separation standards from the current 2000 ft to 1000 ft between flight levels 290 and 410 by 2004. However, when the vertical separation limit was recently reduced to 1000 ft for trans-oceanic flights, pilots reported that the frequency of wake vortex encounters increased and some reported encountering wake turbulence on a regular basis. On the other hand, as Free Flight will eventually allow more freedom in the selection of routes and altitudes, it may result in more flight-path crossings. Combining more frequent intersecting flight paths with lower vertical separation limits, a substantial increase in en-route wake turbulence encounters is anticipated.

The Nominal Wake Model

Wake vortices induce various motions on a following aircraft depending on the size ratio between aircraft and point of entry into the vortex field. These motions include lifting, yawing, pitching and rolling. The most hazardous of these is an overpowering rolling moment near the center of the vortex. Although all six components of motion are experienced in an encounter, it was observed that the roll acceleration and maximum bank angle were the parameters most affected by an axial penetration of the wake vortex. More specifically, a Lear Jet-23 used in the wake encounter research was observed to roll 360 degrees when it encountered the center of the wake of a C-5A. In other types of aircraft, roll excursions of 40–80 degrees were not uncommon. Even with aircraft of similar size, it is necessary for the pilot to apply control motions quickly to offset the wake-induced motions.

The wake model described herein assumes that the vortex sheet is completely rolled-up and that there are only two counter-rotating vortices. The model also assumes that the primary hazard to encountering aircraft is due to loss of roll control when flying in-trail within the earth's boundary layer and a secondary hazard due to vertical accelerations that may exceed structural load limits when flying across the wake at altitude. The vortex is assumed to be non-hazardous if the maximum vortex-induced rolling moment is a specified fraction of the roll control authority of the following aircraft and the vortex-imposed structural load is a specified fraction of the structural load limit of the crossing aircraft.

Defining and Modeling the Hazard Zone

Prior wake vortices researches studied the internal structure of the wake. The present invention, however, focuses on defining a wake hazardous area that, if known, the pilot would avoid all together. The lateral and vertical cross-sectional limits (y-z plane) of this hazardous area can be defined as that region outside of which an encountering aircraft has the on-board control authority to overcome the wake-induced forces and a reserve for necessary aircraft maneuvering and flight-path corrections without causing damage to the aircraft or discomfort to the occupants.

Figure 9A:
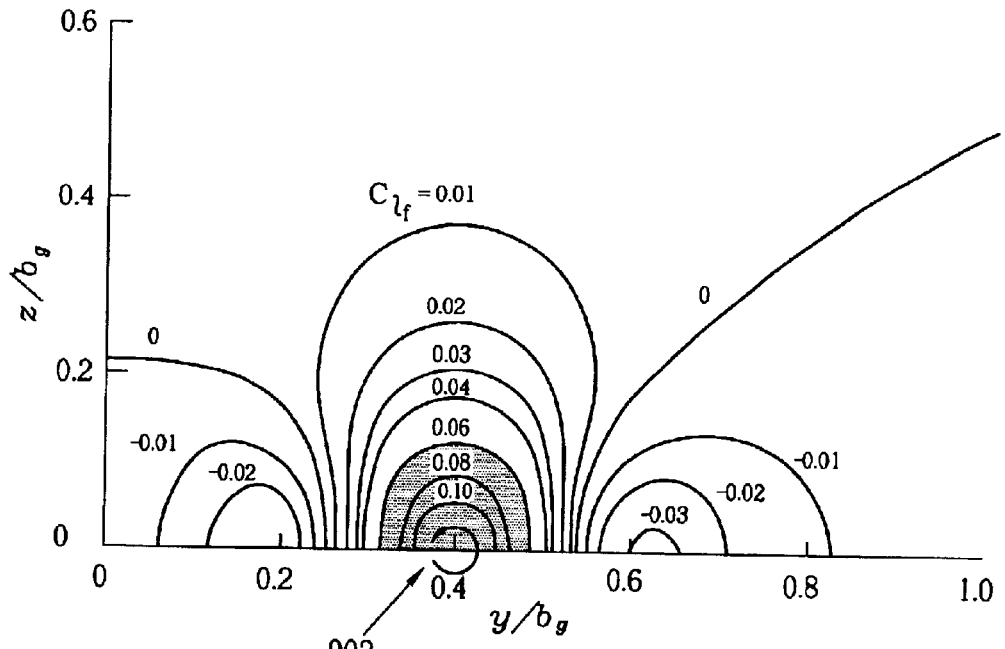
FIG. 9A plots constant rolling-moment coefficient for one quadrant of an exemplary wake.
Figure 9B:
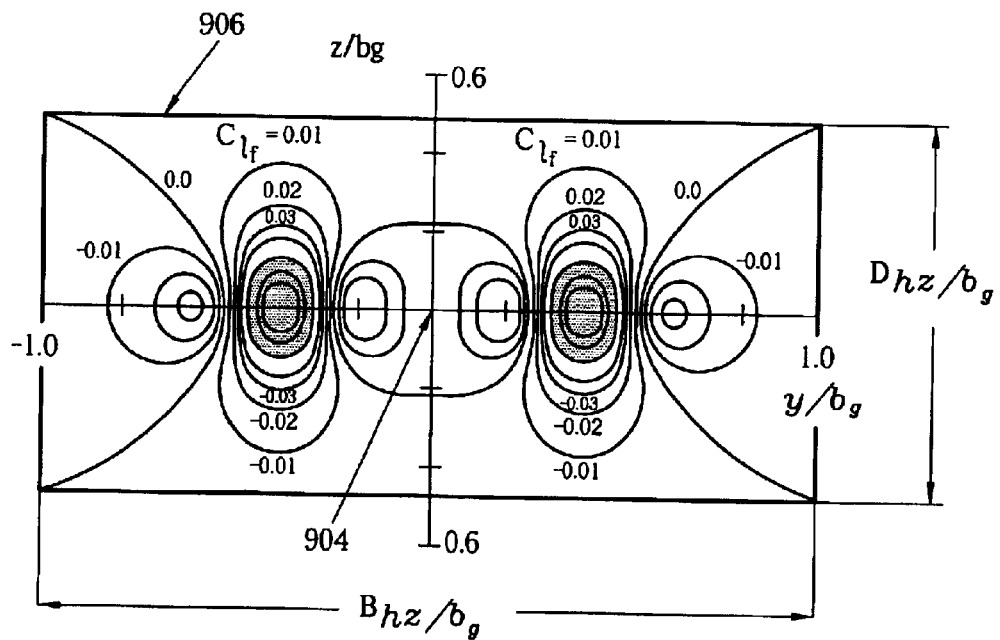
FIG. 9B illustrates a whole flow field of the wake of FIG. 9A.

Some prior studies suggest that the hazardous portion of the wake could be wholly contained within a box the size of $2b_g \times 1b_g$ in the y-z plane. The maximum aileron-induced rolling-moment coefficient is on the order of $|C_{1\_m}| \sim 0.06$ for typical subsonic transport aircraft. As is known in the art, when the wake-induced rolling-moment coefficient $|C_{1j}| \leq 0.03$, it is estimated that subsonic transports would have enough roll control power for the ailerons to cope with and recover from any vortex-induced roll excursion. FIG. 9A plots the contour lines of constant rolling-moment coefficient for one quadrant of the wake produced by the wake-induced rolling moment of the following wing for a range of locations. In FIG. 9A, the center of the right hand vortex 902 is located at approximately 0.4 $y/b_g$ and 0 $z/b_g$. Assuming the wake to be symmetrical above and below the vortex centers and anti-symmetrical port and starboard, the contours of FIG. 9A were superposed to produce contours for the whole flow field shown in FIG. 9B. The center of the plot (0,0), however, is placed at the center of the wake 904 and not the center of the wake-generating aircraft (not shown), nor the center of the core of one vortex of the pair. A cross-sectional boundary of the hazardous region 906 can be seen in FIG. 9B. Outside of the hazardous region 906, the wake-induced rolling-moment coefficient $|C_{1v}|$ is less than 0.01 and does not pose a rolling-moment hazard. FIGS. 9A and 9B are representative of the wake structure between about one-fourth of a mile to three miles behind a wake-generating aircraft. If this structure is assumed for the life of the wake, it should represent the worst case scenario. Thus, if the cross-sectional boundary of the hazardous region 906 is defined as $2b_g \times 1b_g$, which is well outside the 0.01 contour lines, an encounter would be barely detectable. Table 3 lists the cross-sectional dimensions of the hazard area of some typical aircraft.

TABLE 3

| TYPE | WINGSPAN (ft) (Wake Hazard Depth) | WAKE HAZARD WIDTH (ft) |
| --- | --- | --- |
| Antonov 225 | 290 | 580 |
| B-747-400P | 211 | 423 |
| B757-200A | 125 | 250 |
| A320B | 111 | 223 |
| B-727-200E | 108 | 116 |
| DC-9 series 30 (MD 80) | 93 | 187 |
| Learjet 45 | 44 | 88 |
| Piper Saratoga | 36 | 72 |

Figure 10:
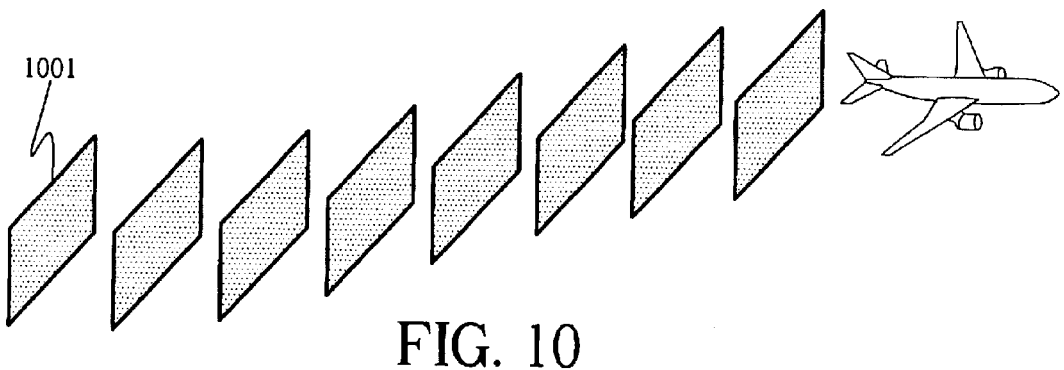
FIG. 10 illustrates the wake hazard zone according to an aspect of the present invention.

In some embodiments, the wake vortices are modeled as a series of cross-sectional slices of the wake or "wake planes." These wake planes represent the dimensions of the cross-section of the wake hazard area, $2b_g \times 1b_g$, plus the uncertainty over time. Thus, an individual wake plane 1001 appears on the display at the location of its origin and then its individual movement is subject to its own sink rate and the wind vector at its point of origin. As shown in FIG. 10, each wake plane is deposited at a specific time interval, e.g., one second interval, and moves independently of all other wake planes.

Modeling the Vertical Motion of the Wake

As described before, the vertical motion of the wake is driven by the mutual induction of the vortex pair. Thus, in the absence of atmospheric effects, the vortices move downward with equal uniform velocity. This movement is called downwash and the velocity at which it moves is called the self-induced descent velocity (w) or sink rate and is dependant on $\Gamma$ and b'. Thus, vortex wakes of subsonic aircraft can be estimated by first calculating the vortex strength $\Gamma$ or circulation of each vortex from theoretical equations and then used to obtain a good approximation of the sink rate (w). Vortex strengths ($\Gamma$) range on the order of 6000 ft$^2$/s for the Boeing 747 and MD-11 to 4000 ft$^2$/s for a B-757 and 767 to 2000 ft$^2$/s for an F-16 and Gulfstream IV. Equation 1 can be used to calculate a representative value for the vortex strength ($\Gamma$); however, the coefficient of lift ($C_L$), vortex span (b') and the aspect ratio (AR) are not easily determined in-flight. Therefore, to use this equation in the wake model according to the present invention, it is necessary to modify it in terms of known values.

$$\frac{\Gamma_o}{bV_\infty} = \frac{1}{2} \frac{b}{b'} \frac{C_L}{AR} \qquad (1)$$

Equation 2 is the standard equation for lift where $q = \frac{1}{2}\rho V^2$.

$$L = qSC_L \qquad (2)$$

Substituting Equation 2 into Equation 1 replaces the coefficient of lift ($C_L$) with another unknown, lift (L).

$$\Gamma_o = \frac{L}{\rho V_\infty b'} \qquad (3)$$

Since lift equals weight in level unaccelerated flight, weight (W) can be substituted for lift (L) in Equation 3 with the assumption that the loading induced by accelerated flight does not appreciably increase the value of $\Gamma$.

$$\Gamma_o = \frac{W}{\rho V_\infty b'} \qquad (4)$$

It can be seen from Equation 4 that $\Gamma$ is proportional to the weight (W) of an aircraft and inversely proportional to the air density ($\rho$), velocity (V), and vortex span (b'). Thus, the vortex strength ($\Gamma$) is greatest on takeoff when aircraft are heavy and slow. This would also explain why the wake of the B-757, which is classified as a large aircraft, has roughly the same vortex strength as some heavies. The B-757 is heavier than other aircraft of similar wingspan or conversely has a shorter wingspan, which translates into a shorter vortex span, than other aircraft of similar weight.

Tables 4–6 illustrate theoretical values of vortex strengths for some typical aircraft at various air densities and air speeds using Equation 4. The values in Table 4 were calculated at approach speed and standard sea level density, the values in Table 5 were calculated at 200 kts and 3000 feet MSL standard density, and Table 6 was calculated at 250 kts and 5000 feet MSL standard density. $\Gamma$ is calculated using the operational empty weight (OEW) and the maximum landing weight (MLW) for each aircraft.

TABLE 4

| AIRCRAFT | SPAN (ft) | b' (b' = 0.8b) | APP SPEED (kts) | OEW (lbs) | OEW GAMMA (ft²/s) | MLW (lbs) | MLW GAMMA (ft²/s) |
|---|---|---|---|---|---|---|---|
| Antonov An-225 | 290.00 | 232.00 | 145 | 771600 | 5717 | 1100000 | 8151 |
| B-747-400P | 211.42 | 169.13 | 146 | 399000 | 4028 | 574000 | 5794 |
| B-757-200A | 124.83 | 99.87 | 132 | 127810 | 2417 | 210000 | 3971 |
| A320 B | 111.25 | 89.00 | 135 | 93031 | 1930 | 142195 | 2950 |
| B-727-200E | 108.00 | 86.40 | 138 | 99000 | 2070 | 160000 | 3345 |
| DC-9 Series 30 | 93.42 | 74.73 | 135 | 57190 | 1413 | 110000 | 2718 |
| Learjet 45 | 43.75 | 35.00 | 139 | 14460 | 741 | 19500 | 999 |
| Piper Saratoga | 36.20 | 28.96 | 100 | 2364 | 203 | 3600 | 310 |

TABLE 5

| AIRCRAFT | SPAN (ft) | b' (b' = 0.8b) | SPEED (kts) | OEW (lbs) | OEW GAMMA (ft²/s) | MLW (lbs) | MLW GAMMA (ft²/s) |
|---|---|---|---|---|---|---|---|
| Antonov An-225 | 290.00 | 232.00 | 200 | 771,600 | 4530 | 1,100,000 | 6457 |
| B-747-400P | 211.42 | 169.13 | 200 | 399,000 | 3213 | 574,000 | 4622 |
| B-757-200A | 124.83 | 99.87 | 200 | 127,810 | 1743 | 210,000 | 2864 |
| A320 B | 111.25 | 89.00 | 200 | 93,031 | 1424 | 142,195 | 2176 |
| B-727-200E | 108.00 | 86.40 | 200 | 99,000 | 1561 | 160,000 | 2522 |
| DC-9 Series 30 | 93.42 | 74.73 | 200 | 57,190 | 1042 | 110,000 | 2005 |
| Learjet 45 | 43.75 | 35.00 | 200 | 14,460 | 563 | 19,500 | 759 |
| Piper Saratoga | 36.20 | 28.96 | 120 | 2,364 | 185 | 3,600 | 282 |

TABLE 6

| AIRCRAFT | SPAN (ft) | b' (b' = 0.8b) | SPEED (kts) | OEW (lbs) | OEW GAMMA (ft²/s) | MLW (lbs) | MLW GAMMA (ft²/s) |
|---|---|---|---|---|---|---|---|
| Antonov An-225 | 290.00 | 232.00 | 250 | 771,600 | 3848 | 1,100,000 | 5486 |
| B-747-400P | 211.42 | 169.13 | 250 | 399,000 | 2730 | 574,000 | 3927 |
| B-757-200A | 124.83 | 99.87 | 250 | 127,810 | 1481 | 210,000 | 2433 |
| A320 B | 111.25 | 89.00 | 250 | 93,031 | 1209 | 142,195 | 1849 |
| B-727-200E | 108.00 | 86.40 | 250 | 99,000 | 1326 | 160,000 | 2143 |
| DC-9 Series 30 | 93.42 | 74.73 | 250 | 57,190 | 885 | 110,000 | 1703 |
| Learjet 45 | 43.75 | 35.00 | 250 | 14,460 | 478 | 19,500 | 645 |
| Piper Saratoga | 36.20 | 28.96 | 135 | 2,364 | 175 | 3,600 | 266 |

Comparing Tables 4, 5, and 6, it may appear that Γ decreases with altitude. However, from Equation 4 it can be seen that Γ increases with altitude (decreasing air density), but decreases with an increase in airspeed. The distance between the vortex cores (b') or vortex span of the characteristic counter-rotating vortex pair is on the order of 75% of the wingspan of the generating aircraft in cruise flight to 80% on approach and depends on the configuration (slat and flap arrangement and settings), wing loading, and angle of attack of the aircraft. b' for various aircraft in landing configuration ranges from approximately 75 ft for the DC-9 to 170 ft for the Boeing 747. As the configuration of the aircraft changes during takeoff and landing, b' changes and, as a result, the vortex strength changes. Table 7 illustrates the change in vortex strength with altitude and airspeed for a Boeing 747-400 using the maximum landing weight.

TABLE 7

| Altitude (ft) | A/S (kts) | Gamma (ft²/s) |
|---|---|---|
| SL | 146 | 5794.26 |
| 1000 | 146 | 5966.92 |
| 2000 | 200 | 4486.57 |
| 3000 | 200 | 4622.16 |
| 4000 | 200 | 4762.85 |
| 5000 | 250 | 3927.09 |
| 7000 | 250 | 4174.28 |
| 9000 | 250 | 4440.97 |
| 11000 | 366 | 3230.21 |
| 15000 | 378 | 3556.7 |
| 20000 | 398 | 3989.32 |
| 25000 | 418 | 4516.34 |
| 30000 | 0.86 M | 4460.63 |
| 35000 | 0.86 M | 5505.77 |
| 40000 | 0.86 M | 6966.77 |
| 45000 | 0.86 M | 8859.31 |

Wake vortices descend behind the generating aircraft by mutual induction carrying a column of recirculating air down with them. The self-induced descent velocity (w), determines how fast the wake may descend behind the generating aircraft and out of the flight path of the following aircraft. In order to determine an accurate value of the velocity at which the vortex descends, knowledge of the specific aircraft's lift (L), velocity (V), slat and flap arrangement and setting, and the density of the air (ρ) in which the aircraft is flying is required. A less accurate value for the vortex sink rate can be derived from knowledge of the vortex strength (Γ) and the vortex span (b') (Equation 5).

$$w = \frac{\Gamma_o}{2\pi b'} \quad (5)$$

Substituting Equation 4 into Equation 5 yields an Equation 6 for the sink rate of the vortex as a function of the known or estimated parameters.

$$w = \frac{W}{2\pi \rho V b'^2} \quad (6)$$

It can be seen from the above equations that w is proportional to Γ and W. Therefore, larger aircraft have higher descent velocities. With a decrease in aircraft velocity, as on final approach, the sink rate also increases which actually is beneficial because it would help to move the vortex out of the flight path faster. Table 8 illustrates some theoretical descent velocities calculated at the aircraft's OEW and MLW.

TABLE 8

| TYPE | b' (ft) | $V_{app}$ (kts) | OEW (lbs) | OEW w (ft/s) | MLW (lbs) | MLW w (ft/s) |
| --- | --- | --- | --- | --- | --- | --- |
| B757-200A | 100 | 132 | 127,810 | 3.85 | 210,000 | 6.33 |
| B-727-200E | 86 | 138 | 99,000 | 3.81 | 160,000 | 6.16 |
| DC-9 series 30 | 75 | 135 | 57,190 | 3.01 | 110,00 | 5.05 |
| Antonov 225 | 232 | 145 | 771,600 | 3.92 | 1,100,000 | 5.59 |
| B-747-400P | 169 | 146 | 399,000 | 3.93 | 574,000 | 5.45 |
| A320B | 89 | 135 | 93,000 | 3.58 | 142,200 | 4.86 |
| Learjet 45 | 35 | 139 | 14,500 | 3.50 | 19,500 | 4.54 |
| Piper Saratoga | 29 | 100 | 2364 | 1.70 | 3,600 | 2.02 |

Figure 11:
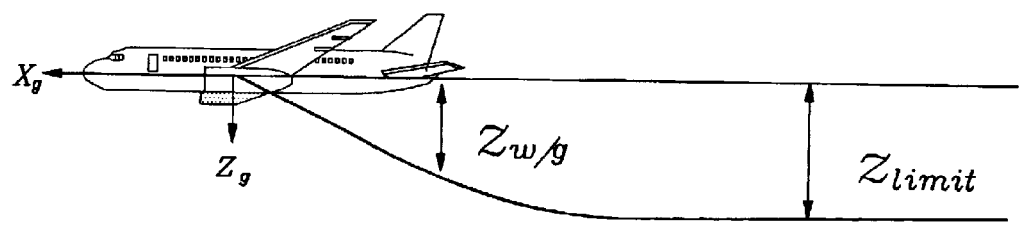
FIG. 11 illustrate a vortex descent theory employed by the present invention.

Observations of actual wakes have shown that vortices stop their descent at some level below the aircraft and then remain near that level until they dissipate ($z_{limit}$) as illustrated in FIG. 11. The amount of descent appears to vary with atmospheric conditions. There seems to be no clear consensus on how far the vortices descend before leveling off. Some observed that vortices descend about 500–1000 ft before their downward motion slows or stops, although full-scale flight tests conducted via Boeing aircraft showed that the vortex settles to approximately 900–1000 ft below the wake-generating aircraft. Nevertheless, it is understood that the wake rarely descends more than 6b'. Accordingly, assuming a final descent distance of 6b', the descent distance for various aircraft in landing configuration would seem to fall in the range of about 500–1000 ft as shown in Table 9.

TABLE 9

| TYPE | WINGSPAN (ft) | b' | $z_{limit}$ |
| --- | --- | --- | --- |
| Antonov 225 | 290 | 232 | 1392 |
| B-747-400P | 211 | 169 | 1015 |
| B757-200A | 125 | 100 | 599 |
| A320B | 111 | 89 | 534 |
| B-727-200E | 108 | 86 | 518 |
| DC-9 series 30 | 93 | 75 | 488 |
| Learjet 45 | 44 | 35 | 210 |
| Piper Saratoga | 36 | 29 | 173 |

According to the principles of the present invention, the wake vortices are modeled as cross-sectional slices of the wake or wake planes. Each wake plane has its own equations of motion. The variables are filled according to the conditions at the time of its release. Therefore, the motion of one wake plane may be slightly different than the motion of an adjacent wake plane depending on these conditions. Once released, a wake plane will descend as a function of w (Equation 6) until it reaches $z_{limit}$ (Equation 7). It will then level off and remain until its lifespan has expired.

$$z_{limit} = 6b' \quad (7)$$

Modeling Horizontal Motion of the Wake

Figure 12:
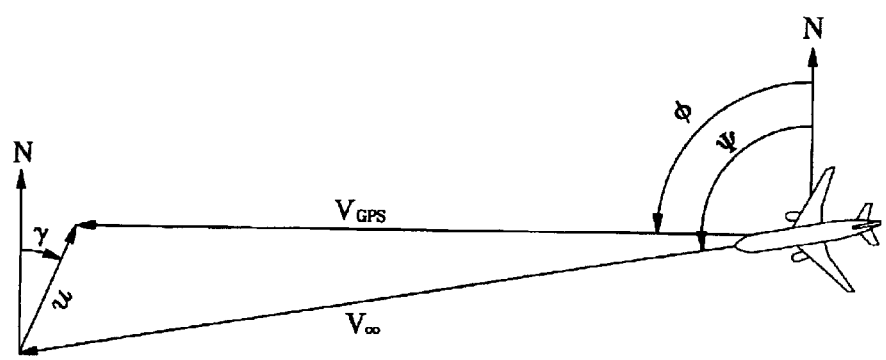
FIG. 12 shows parameters for determining individual wind vector for each wake plane.

The horizontal motion of the wake is driven by the motion of the air mass in which it is embedded. More simply put, the horizontal motion of the wake is driven by the wind. In the present embodiment, the wind is determined by subtracting the true airspeed vector $V_\infty$ from the ground speed vector $V_{GPS}$ as shown in FIG. 12, where φ is the GPS heading, ψ is the true heading, γ is the wind direction, and u is the wind speed. At the time a wake plane is generated, the wind speed vector is calculated and attached to that wake plane. The motion of that wake plane is thus determined by its own wind vector. This modeling method takes into account that each wake plane moves with its own set of equations of motion and the movement of one wake plane may be slightly different than adjacent wake planes due to the varying aircraft and atmospheric states.

Modeling Lifespan of the Wake

The time it takes a wake to dissipate is determined by the initial strength of the vortex and atmospheric conditions. The atmospheric conditions that exist at the time and place a wake is deposited are the most significant contributors to the breakup and dissipation of the wake. A vortex deposited in an area where there is little atmospheric disturbance can last more than 10 minutes and hundreds of miles. The issue, however, is not how long the vortex can last, but how long it takes a wake vortex to reach a non-hazardous state. Ground-based experiments revealed that the tangential velocity of wake vortices undergoes negligible decay in the first part of their history after the initial roll-up lasting from several spans to tens of spans. Downstream of this area, the wake vortex decays or disperses as a function of $1/t^{1/2}$. The challenge is to find, in the lifespan of a wake, a point at which the wake no longer presents a hazard for aircraft. Researchers have spent considerable time and resources in pursuit of this objective and are still uncertain in knowing or predicting the point at which a wake becomes non-hazardous.

The time after which the wake is no longer a hazard refers to the degree of upset or disturbance that might be experienced by an encountering aircraft. In other words, the time after which an aircraft can safely enter the wake of another without causing loss of control or discomfort to the occupants. This assessment would depend on the relative sizes of the wake-generating and encountering aircraft and the present atmospheric conditions. What is hazardous for one class of aircraft may not be hazardous for another. Since an object of the present invention is to provide a flight crew with the means to avoid a hazardous region of airspace in which the wake is located, it is necessary to determine how long the wake lifespan is and hence how long the wake visualization should be. Techniques in determining in-trial lifespan from vortex-induced rolling-moments will first be discussed, followed by cross-trail lifespan due to vortex-induced vertical loads.

Measurements taken of 1000 vortex wakes at the Frankfurt International Airport (FIA) revealed a maximum vortex lifespan of about 180 seconds within the atmospheric surface layer (ASL). After a lifespan of about 90 seconds most of the vortices could no longer be registered at FIA, which lead to the assumption that the mean vortex lifespan is about 75 seconds. Some have suggested that the maximum vortex lifespan is 2.6 minutes above and 2 minutes within the earth's boundary layer where the final approach corridor lies entirely. Depending on atmospheric conditions, the planetary boundary layer is on the order of 100 to 3000 m (328–9850 ft). The lifespan of the wake of a Boeing 747, the heaviest civilian transport with the largest vortex strength, is observed to be roughly 130 seconds (2.2 min) in negligible turbulence.

A value for the lifespan of a wake vortex can be estimated by calculating the vortex-induced rolling-moment coefficient ($\leq 0.03$) of a wake-generating aircraft on a following aircraft. The lifespan would then be the time after which the wake-induced rolling-moment coefficient drops below 0.03. The rolling moment about the longitudinal axis is derived from taking the sum of the rolling moment of the vortex across the wingspan of the encountering aircraft using the known strip theory first suggested by Prandtl (Equation 8), $$\mathcal{L} = \sum \mathcal{L}(y)y \qquad (8)$$
$$= \sum_{C_{l\alpha}} \Delta\alpha(y) q_{C_f}(y) y \Delta y$$
$$= C_{l\alpha}\frac{q}{V} \sum_{b_f/2}^{-b_f/2} v_t(y)_{C_f}(y) y \Delta y$$

and in coefficient form $$C_l = \frac{\mathcal{L}}{qS_f b_f} = \frac{c_{l\alpha}}{S_f b_f V_\infty} \sum_{b_f/2}^{-b_f/2} v_t(y)_{C_f}(y) y \Delta y \qquad (9)$$

The tangential velocity ($v_t$) of the wake vortex can be estimated using the Lamb-Oseen vortex model (Equation 10), which has been widely used to characterize the airflow within the wake.

$$|v_t| = \frac{\Gamma_o}{2\pi r}\left[1 - e^{-\frac{y^2}{4\epsilon t}}\right] \qquad (10)$$

where $\epsilon$ is the eddy viscosity constant. As one skilled in the art would appreciate, $\epsilon = 0.0002\Gamma_0$ has been shown to be a good approximation.

Figure 13:
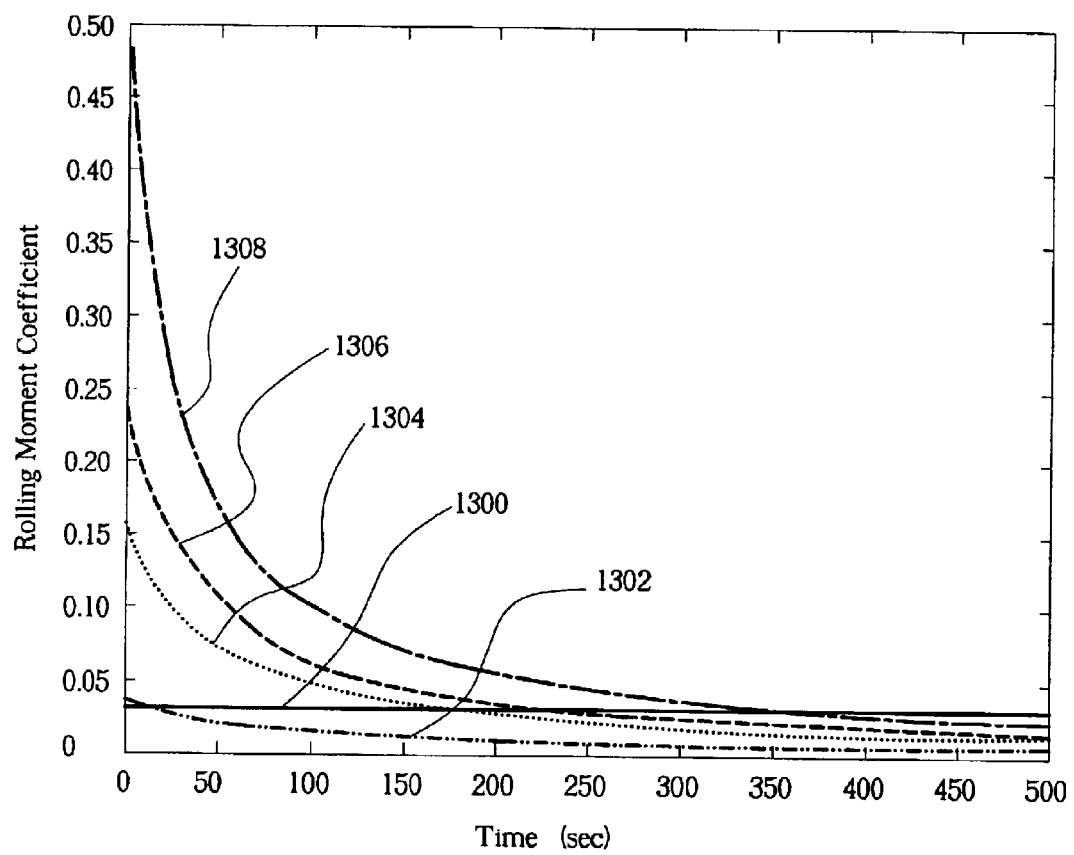
FIG. 13 illustrates the effect of airspeed on the vortex lifespan.

In the present embodiment, to determine the vortex-induced rolling-moment coefficient ($C_l$), Equation 10 is substituted into Equation 9 and $C_l$ was calculated for various aircraft pairs. FIG. 13 illustrates the effect of airspeed on the vortex lifespan during various phases of flight. Specifically, FIG. 13 plots the wake-induced rolling-moment coefficient of a Boeing 747 on a Lear Jet 23 at various airspeeds where 1300 represents the maximum safe rolling moment coefficient, 1302 represents the maximum cruise speed (~0.8 Mach), 1304 represents airspeeds below 10,000 ft MSL at about 250 kts, 1306 represents the initial approach speed at about 200 kts, and 1308 represents the final approach speed at about 140 kts. As can be seen in FIG. 13, the lifespan of the wake of the Boeing 747 with respect to the Lear Jet 23, when both aircraft are traveling at the final approach speed, is about 390 seconds (6.2 min.). When both aircraft are traveling at the initial approach speed, the lifespan drops to about 250 seconds (4 min). The lifespan is only about 20 seconds when both aircraft are traveling at their maximum cruise speed. Therefore, as shown in FIG. 13, as a result of the rolling-moment coefficient, lifespan is the longest at lower airspeeds. Moreover, based on the calculated lifespan for cruise airspeeds, using the vortex-induced rolling-moment coefficient for this phase of flight is inadvisable. A better method for calculating lifespan for cruise is described herein in a later section.

Figure 14A:
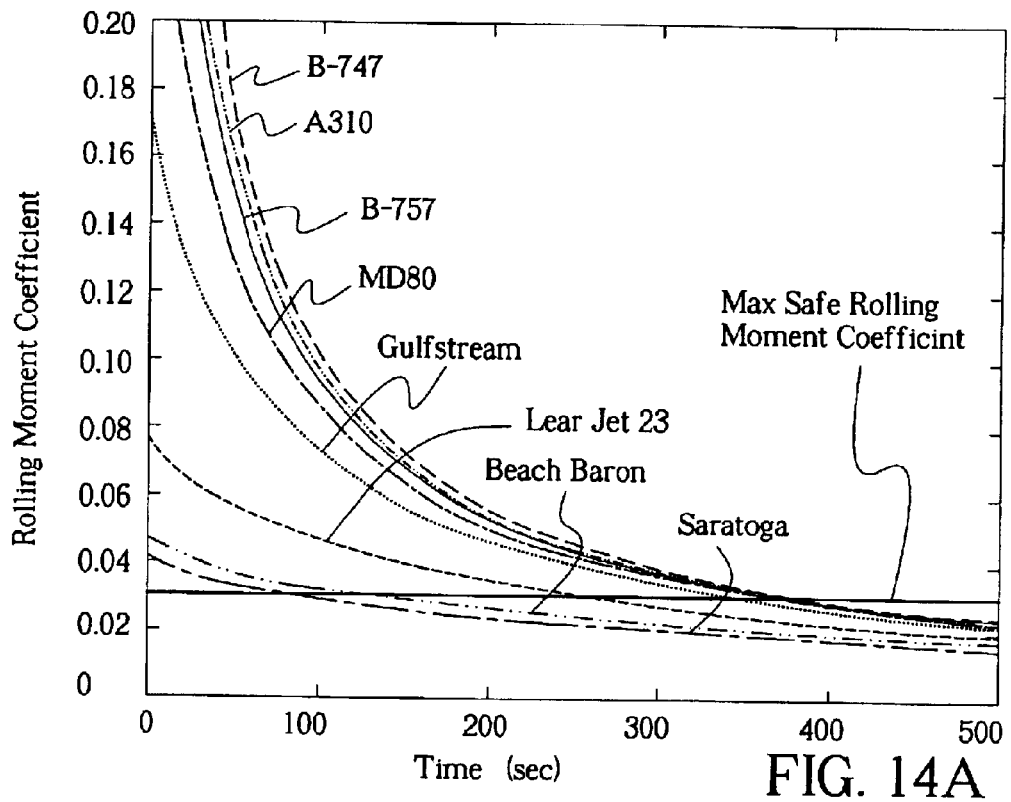
FIG. 14A shows a relationship between lifespan of vortices generated by various aircraft with respect to the same encountering aircraft.
Figure 14B:
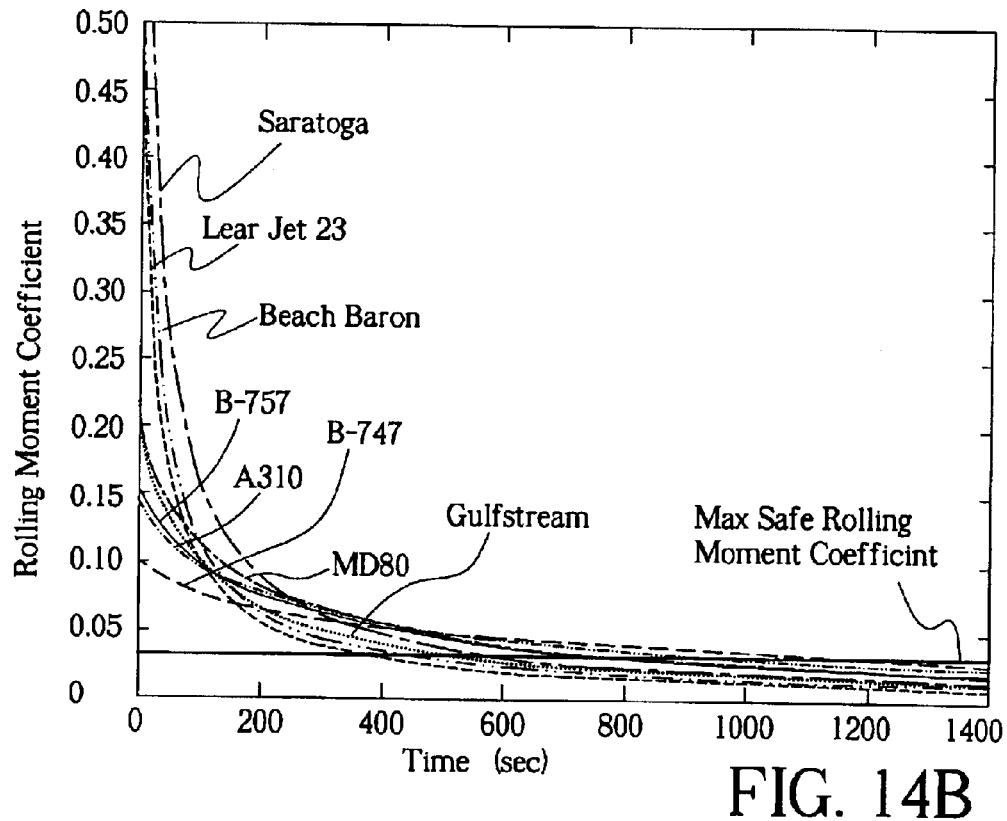
FIG. 14B shows a relationship between lifespan of a wake vortex generated by one aircraft with respect to various encountering aircraft.

FIG. 14A shows the lifespan of vortices generated by various wake-generating aircraft with respect to the same encountering aircraft, a Lear Jet 23. It can be seen that the vortex-induced in-trail rolling-moment coefficient changes with the ratio of the span of the encountering aircraft to that of the wake-generating aircraft. FIG. 14B illustrates the relationship between the wake vortex generated by the same wake-generating aircraft, a Boeing 747, and various encountering aircraft. Note the difference in time scale between FIG. 14A and FIG. 14B, with all aircrafts shown at approach speed.

As shown and described herein with reference to FIG. 8, (1a), (1b), and (1c), cross-trail lifespan due to vortex-induced vertical loads presents a secondary hazard to an encountering aircraft penetrating a vortex at right angles and in-line with the vortex core. Such cross-trail encounter can subject the aircraft to loads sufficient to cause primary structural damage. A penetration at any other angle would lessen the hazard. However, the hazard in this type of encounter is likely increased by the instinctive control reactions of the pilot, which can cause a substantial increase in the loads on the aircraft particularly in the negative direction.

Some researchers suggest that loads imposed by a cross-trail encounter are based on momentum transfer, e.g., between the downward momentum contained in the vortex trail of the wake-generating aircraft and the momentum transferred to the encountering aircraft. The rate at which the downward momentum is generated is said to be related to the weight of the wake-generating aircraft in steady flight (Equation 11)

$$W_g = \rho V_g A_0 \Delta w_g \qquad (11)$$

where $A_0$ is the cross-sectional area of the wake at time t=0 and $\Delta w_g$ is the increment in downward velocity imparted to the wake by the lift of the wake-generating wing. Assuming the downward momentum in the wake is transferred to the encountering aircraft such that $$\Delta M_f = \Delta M_v \qquad (12)$$

This momentum transferred to the encountering aircraft then imparts a downward velocity increment given by Equation 13.

$$\Delta M_f = W_f \Delta w^f \qquad (13)$$

The downward momentum in the wake is given by Equation 14

$$\Delta M_v = g\rho \frac{b_f}{\sin\theta_f} \frac{b_f A_v}{D_v} \Delta w_v \qquad (14)$$

where $D_v$ is the depth of the wake and $\theta_f$ is the intercept angle between the encountering aircraft and the wake, which is set to 90° for the worst case.

The wake spreads as it ages, which means that the cross-section of the wake as a whole enlarges with time. It is assumed that the encountering aircraft passes through the entire wake and that momentum is conserved as the wake spreads so that the change in the cross-section as the wake ages does not change the total momentum transferred from the wake to the encountering aircraft (Equation 15)

$$A_t \Delta w_v = A_0 \Delta w_g \quad (15)$$

where $A_t$ is the cross-sectional area at the time the encountering aircraft penetrates the wake. Further, air density is assumed to remain constant with time.

Combining Equations 11–15 leads to the total increment in downward velocity imparted on the encountering aircraft by the downwash in the wake (Equation 16).

$$\Delta w_f = \frac{g}{V_g} \frac{W_g}{W_f} \frac{b_f^2}{D_v \sin\theta_f} \quad (16)$$

To determine the loads over the duration of the encounter, assume a time interval, $\Delta t$, over which the downward momentum is transferred (Equation 17)

$$\Delta t = \frac{B_v + b_f \cos\theta_f}{V_f \sin\theta_f} \quad (17)$$

where $B_v$ is the width of the vortex.

The vertical acceleration of the aircraft as it encounters the wake is given by Equation 18.

$$a_f = \frac{\Delta w_f}{\Delta t} \quad (18)$$

Substituting Equations 16 and 17 into Equation 18 yields the acceleration in g-loading of the aircraft as it encounters the wake (Equations 19)

$$\frac{a_f}{g} = k \frac{V_f}{V_G} \left[ \frac{b_g^2}{D_v(B_v + b_f \cos\theta_f)} \right] \left( \frac{W_g}{b_g^2} \frac{b_f^2}{W_f} \right) \quad (19)$$

where k is an adjustment factor for any item not correctly represented in the global analysis.

It has been determined, through a comparison with the more complete analyses known in the art, that k=1 is appropriate.

The next step is to determine when a wake may be safe for a cross-trail encounter. As discussed before, the worst case would be an encounter at right angles, when $\theta_f$ is 90° (Equation 20).

$$\frac{a_f}{g} = \frac{V_f}{V_G} \left( \frac{W_g}{A_v} \frac{b_f^2}{W_f} \right) \quad (20)$$

If $a_f/g$ is set to be less than or equal to ½ the normal load limit of the encountering aircraft, it is possible to determine the lifespan of the wake for cross-trail encounters by determining when the wake hazard area has spread to a value equal to $A_v$.

Therefore, according to an aspect of the invention, the angle at which the encountering aircraft intercepts the wake is deterministic to the lifespan of the wake. That is, in the present embodiment, the lifespan of the wake is modeled by first determining whether the encountering aircraft will intercept the wake at an angle between 45° and 135°. If the intercept angle falls within these values, the cross-trail lifespan model would be used to determine how long to display the wake visualization. Otherwise, the in-trail lifespan model would be used.

Uncertainty Analysis

The fundamental usefulness of any prediction comes from the accuracy of the information on which the prediction is based and the uncertainty of the parameters used in that prediction. Because one cannot know the accuracy of any prediction until the time frame of the prediction has expired, predictions by their very nature carry a high degree of uncertainty, especially predictions made without the benefit of extensive measurements or experimentations. What is more, wake vortex behavior is known to possess a high degree of uncertainty. The simplicity of the wake model disclosed herein contributes even more uncertainty. Uncertainty analysis is therefore an integral part of the wake prediction presented herein. Since no experimental data are available for the wake model disclosed herein, only the general uncertainty is considered and not the systematic (bias) or random (precision) uncertainty. The methodology used to determine the general uncertainty of the present wake model is derived from the approach introduced by Coleman, H. W., Steele, W. G., in "Experimentation and Uncertainty Analysis for Engineers," John Wiley & Sons, Inc., New York, 1999. The uncertainty is based on partial differentiation of the equations of motion with respect to the independent variables and a 95% confidence level for the accuracies of these variables.

The quantities that affect the motion of wake vortices and, therefore, determine the sources of the uncertainty in the prediction are the:

location of the wake-generating aircraft with respect to encountering aircraft;

location and movement of the hazardous region;

size of the hazardous region; and time at which the vortex is no longer a hazard.

In some embodiments, the location of the generating aircraft and its relationship to the following aircraft is determined via the GPS and the ADS-B onboard both aircraft. As discussed before, the location and movement of the hazardous region is determined by the sink rate of the vortex and the wind speed and direction. The size of the hazardous region is estimated by the wingspan of the generating aircraft. The time after which the wake is no longer hazardous depends on the lifespan of the wake, the modeling of which depends on the angle at which the encountering aircraft intercepts the wake.

GPS accuracy depends on the implementation of the GPS receiver. This includes precise positioning service (PPS) and standard positioning service (SPS) implementations and P code, C/A code, L1/L2, L1-only and differential GPS (DGPS), as well as, various combinations thereof. GPS technology is well known in the art and thus not further described herein for the sake of brevity.

In some embodiments, the GPS accuracy is determined via the Wide Area Augmentation System (WAAS) and its associated research conducted at Stanford University. Considering a worst-case geometry acceptable for use, the vertical accuracy can be estimated by dividing the PT1 vertical alert limit (VAL) for WAAS of 12 meters by the K-factor multiplier of 5.33. This yields a worst-case vertical position sigma error of 2.25 m. The vertical position error is the limiting factor and the worst case horizontal geometry would scale with this value by a horizontal/vertical fraction of 0.7. Therefore, the horizontal accuracy is 1.58 m. Finally, as shown in Table 10, the velocity accuracy is found to be 0.55 m/s and 0.415 m/s one-sigma vertical and horizontal velocities, respectively.

TABLE 10

| Vertical Position | Horizontal Position | Vertical Velocity | Horizontal Velocity |
|---|---|---|---|
| 2.25 m | 1.58 m | 0.55 m/s | 0.415 m/s |
| 7.38 ft | 5.18 ft | 1.80 ft/s | 1.35 ft/s |
| 0.001215 nm | 0.000853 nm | 1.07 kts | 0.81 kts |

ADS-B is used by the wake-generating aircraft to broadcast its position and velocity and/or by the encountering aircraft to receive the broadcast message. In some embodiments, the ADS-B unit is a Universal Access Transceiver (UAT) provided by United Parcel Service—Aviation Technologies (UPS AT) with the basic broadcast frequency at about 1 H. Although the UAT is designed for two-way communication, it can be used as a one-way conduit, i.e., the UAT can be used by the wake-generating aircraft for broadcast only.

To accurately model the wake location and movement, the broadcast of wind speed and direction of the wake-generating aircraft (i.e., the true heading) are required as well as the airspeed of the wake-generating aircraft. Currently, the ADS-B message does not contain the weight, true airspeed and direction, or the wind velocity vector. It is anticipated that these parameters will be added to the ADS-B message. Alternatively, these values can be estimated on-board the encountering aircraft; however, this adds to the uncertainty of the wake prediction as described hereinafter. The uncertainty in the ADS-B message in its current state is listed in Table 11. On the other hand, as one skilled in the art would appreciate, the present invention is not limited to using the ADS-B message and can be implemented using any wireless datalink technology including TCAS and Mode S.

TABLE 11

| Vertical Position | Horizontal Position | Horizontal Velocity |
|---|---|---|
| 7.62 m | 2.5 m | 0.257 m/s |
| 25 ft | 7.87 ft | 0.84 ft/s |
| 0.0041 nm | 0.0013 nm | 0.5 kts |

Vertical Uncertainty

As discussed before, the size or cross-section of the hazardous region is determined by the wingspan (b) of the generating aircraft (2b×1b). However, the uncertainty in the size of the cross-section depends on how well the location of the wake can be predicted. The location of the hazardous region is predicted from the initial location, the sink rate, and the wind vector. Its uncertainty, in turn, depends on how well the initial location can be predicted, knowledge of the current aircraft state, and the level of simplification of the equations used to model the wake movement.

Weight

As discussed herein, the self-induced descent velocity (w) is dependent on the weight (W) and velocity ($V_\infty$) of the aircraft, the spanwise distance between the vortex centers (b'), and the ambient air density ($\rho$). Throughout a flight, the weight of an aircraft changes from the maximum at takeoff to the minimum at landing. For example, an aircraft at the end of a 10-hour flight will have burned off many tons of fuel, making its approach at a much reduced weight. Thus, knowledge of the aircraft weight at any given time is critical to the accuracy of the wake prediction. However, it is a challenge to obtain the weight of an aircraft in real time, especially since weight is not commonly included in the ADS-B message. The uncertainty due to weight is thus the overwhelming factor in the uncertainty of w.

In some embodiments when the weight cannot be obtained in real time, to accommodate the uncertainty due to the aircraft's weight w for the approach corridor is calculated using a nominal weight based on the mean between the maximum landing weight (MLW) and the operational empty weight (OEW). The spread between the mean and these values is the error bound. When calculating the nominal weight for departure and en-route phases of flight, gross take-off weight (GTW) and OEW are used. This method of determining the weight of an aircraft requires knowledge of the make and model of the aircraft and a table of values stored in the on-board computer.

Preferably, weight of the aircraft is obtained essentially in real time, e.g., weight information is embedded or otherwise included in the ADS-B message. Table 12 illustrates the improvement in uncertainty for the sink rate of a Boeing 747-400P. The published MLW and OEW for the Boeing 747-400P are 574,000 lbs and 399,000 lbs, respectively. Using the nominal weight method, this yields a mean weight of 486,500 lbs and an error bound of 87,500 lbs for an uncertainty of about 21% of w. If the weight is obtained at a resolution of about 25,000 lbs, the uncertainty could be improved to about 13%. After 3 minutes that would be a savings of about 200 ft (61 m) in the depth of the depicted hazard area. As can be seen in Table 12, a resolution of less than 25,000 lbs does not significantly improve the uncertainty of w. It should be noted that the values for w vary with altitude.

TABLE 12

| Weight Resolution | Weight Uncertainty | w (ft/s) | w Uncertainty | % of w |
|---|---|---|---|---|
| 165,000 lbs | ±87,500 lbs | 5.723 | ±1.2298 | 21.5 |
| 25,000 lbs | ±12,500 lbs | 5.723 | ±0.7345 | 12.8 |
| 15,000 lbs | ±7,500 lbs | 5.723 | ±0.6958 | 12.1 |
| 10,000 lbs | ±5,000 lbs | 5.723 | ±0.6832 | 11.9 |
| 500 lbs | ±250 lbs | 5.723 | ±0.6731 | 11.7 |

On the other hand, if the uncertainty is based on a departure or en route scenario, then the nominal weight would be 599,500 lbs, calculated from GTW and OEW. The error bound would then be 190,475 lbs with an uncertainty of about 38% of w. As shown in Table 13, the improvement obtained with 25,000 lb increments is more dramatic (i.e., the uncertainty of w is improved to about 21.3%), with a savings after 3 minutes of about 400 ft (122 m).

TABLE 13

| Weight Resolution | Weight Uncertainty | w (ft/s) | w Uncertainty | % of w |
|---|---|---|---|---|
| 380,950 lbs | ±190,475 lbs | 6.258 | ±2.3811 | 38.05 |
| 100,000 lbs | ±50,000 lbs | 6.258 | ±1.6751 | 26.8 |
| 50,000 lbs | ±25,000 lbs | 6.258 | ±1.4103 | 22.5 |
| 25,000 lbs | ±12,500 lbs | 6.258 | ±1.3359 | 21.3 |
| 10,000 lbs | ±5,000 lbs | 6.258 | ±1.3143 | 21.0 |
| 500 lbs | ±250 lbs | 6.258 | ±1.3101 | 20.9 |

Load Factor

In association with weight, load factor is another major contributor to the uncertainty of w. Based on level unaccelerated flight (or a load factor of 1 g), it has been assumed that weight could be substituted for lift in Equation 3. This assumption can be used in approximately 95% of the time or better. During corrections for minor changes from trimmed flight, the maximum variation in load factor is about 10% or between 0.9 and 1.1 g. During a missed approach procedure, the maximum acceleration is about 1.2 gs. During turning flight, the maximum bank angle is usually limited to 30 degrees or less and generally no more than the number of degrees of heading change. In a level turn 30 degrees translates to about 1.15 gs and in a climbing turn to about 1.2 gs. It has been estimated that a deviation between 0.9 and 1.1 g will fall within a 2–3 sigma distribution.

Vortex Span

The distance between the vortex pair (b') is another contributing factor to the uncertainty of w. b' is a function of the aircraft configuration and angle of attack ($\alpha$). The configuration changes many times during the approach phase and varies from aircraft to aircraft. For all aircraft in all configurations, b' is never greater than 0.8 b and never less than 0.75 b. The nominal value for b' is taken as 0.775b (half way between these two points) with an error bound of 0.025b.

Airspeed

In an exemplary embodiment, true airspeed ($V_\infty$) was measured on board a wake-generating aircraft using a Seagull Technology GIA 2000 AHRS (attitude heading reference system). The GIA 2000 measures the true airspeed with a resolution of 0.001 kts. The true airspeed is then broadcasted using ADS-B, which has a broadcast accuracy of ±1 kt. Combining these two sources, the uncertainty in $V_\infty$ is taken to be ±1 kt.

Air Density

The ambient air density ($\rho$) is determined from the GPS altitude (h) using typical equations for determining standard air density. The uncertainty is therefore a function of the vertical GPS position error and temperature. The uncertainty in p is 0.1% of the estimated ambient air density.

Time Latency

The position of each wake plane, throughout its lifespan, is dependent on the time (t) elapsed since generation. Due to the latency in the ADS-B message, there is an uncertainty in time, which propagates through Equation 7. This latency has been estimated to be 1.0183 seconds.

Total Vertical Uncertainty

Table 14 summarizes the factors contributing to the uncertainty in the self-induced descent velocity w.

TABLE 14

| Weight W | Load Factor n | Vortex Span b' | True Airspeed $V_\infty$ | Time t | Air Density $\rho$ |
|---|---|---|---|---|---|
| aircraft specific | ±0.1 g | ±0.025b | ±1 kt | ±1° | ±0.001 |

The uncertainty in the vertical location of the wake can be derived from linear error propagation based on a first order Taylor series as known in the art. The uncertainty in each variable is to be propagated through Equation 7 and the total uncertainty would be on the order of 20–40% of $z_{w/g}$, depending on the type of aircraft and whether the nominal weight is based on MLW or GTW. Table 15 illustrates the relative contribution of each variable used to derive $z_{w/g}$ for the Boeing 747 at 5000 ft AGL using MLW and approach airspeed. Weight and load factor become more equal in their contributions to uncertainty when the weight can be obtained at a resolution of 25,000 lbs.

TABLE 15

| Variable | Weight W | Load Factor n | Vortex Span b' | True Airspeed $V_\infty$ | Time t | Altitude h |
|---|---|---|---|---|---|---|
| % of the Uncertainty | 70.04 | 21.65 | 8.13 | 0.10 | 0.07 | 0.0 |

Horizontal Uncertainty

To predict the horizontal movement of the wake, it is necessary to know the wind speed and direction. Possible sources for wind data include on-board measurement, remote measurement provided by a wireless communication datalink, and on-board calculation through the use of an on-board computer capable of calculating the wind from knowledge of the true airspeed, true heading, ground speed, and ground track. All three methods of determining the wind vector at any given time may introduce significant error in predicting the horizontal movement of the wake with respect to both time and location.

The wind not only causes the wake plane to move horizontally, its uncertainty will also cause the cross-section of the wake plane to increase as a function of time. That is, any uncertainty in determining the wind contributes to the uncertainty in the size and movement of the wake plane. It is therefore important that the wind vector be determined accurately to keep the size of the wake plane as small as possible. Also, if the wind has an unsteady component of comparable magnitude to the wind speed, allowances must be made in the effective velocity of the wake plane, and its time of travel.

Note in the boundary layer, the magnitude of the mean wind varies between 2 and 10 m/s (~4 and 19 kts) in the outer layer and goes to zero due to friction at the surface. Its component in the vertical direction is of the order of millimeters to centimeters per second and, as understood in the art, is generally neglected. With this in mind, in some embodiments, only the horizontal component of wind is of interest.

On-board measurement has its drawbacks because the measuring devices are only accurate in straight and level flights. As one skilled in the art knows, during flight maneuvers, e.g., turns, climbs, and descents, the on-board instrumentation can be off significantly. On the other hand, remote measurement is the least desirable because it is not measured at the point in space where the wake is being generated and, consequently, introduces a large spatial uncertainty. Accordingly, calculating the wind from knowledge of the true airspeed, true heading, ground speed, and ground track seems to be the better option. If wind (or true airspeed) is not included in the ADS-B message or otherwise obtained in real time, the wind vector must be calculated on-board the following aircraft and this introduces an uncertainty due to the spatial distance between the ownship and the wake plane at the time it was generated.

Uncertainty in Calculating Wind On-board the Encountering (Following) Aircraft

Currently, wind speed and direction is calculated in-flight by most commercial aircraft from knowledge of the true airspeed (from the pilot-static system) and ground speed (usually from an inertial navigation system (INS)). However, when the aircraft is maneuvering, large errors in the airspeed vector determination can occur. Since the calculation of true airspeed uses temperature, temperature errors can also contribute to errors in the wind calculation. Moreover, at present, there is no standard statistical model for the spatial and temporal error of the wind vector.

In some embodiments, the present invention integrates the Berman-Powell statistical model known in the art for wind variations based on data reported by the Aircraft Communication Addressing and Reporting System (ACARS). This statistical model showed very good correlation with the actual wind data. Because the data comes from winds calculated on-board the aircraft and broadcast in the ACARS report. Instrumentation error, airspeed measurement error, and datalink broadcast error are already incorporated in the model.

The horizontal wind velocity is generally broken into two components, north ($u_N$) and east ($u_E$) velocities. The north and east wind velocity components are each a function of latitude ($\lambda$), longitude ($\Lambda$), altitude (h), and time (t). The wind data is represented by:

$$\{u_N(\lambda_k,\Lambda_k,h_k,t_k), u_E(\lambda_k,\Lambda_k,h_k,t_k)\} \quad (21)$$

where k=1, 2, . . . , K. From this, the wind differences ($du_N$, $du_E$) can be determined:

$$du_N = u_N(\lambda_k,\Lambda_k,h_k,t_k) - u_N(\lambda_i,\Lambda_i,h_i,t_i) \quad (22)$$

$$du_E = u_E(\lambda_k,\Lambda_k,h_k,t_k) - u_E(\lambda_i,\Lambda_i,h_i,t_i) \quad (23)$$

where k, i=1, 2, . . . , K.

The objective is to correlate the wind velocities along the flight path. Therefore, it would be desirable to replace the eight arguments in the wind difference equations with time, which represents the traveling time between two measurement points. In the present embodiment, the two points are the location of the ownship and the wake-generating aircraft.

$$t_r = \sqrt{t^2_N + t^2_E + t^2_D + (t_k - t_i)^2} \quad (24)$$

where $t_N$, $t_E$, and $t_D$ are the traveling time due to distance in the north, east, and down directions, respectively. These times are determined from the difference in location of the two points of interest and the horizontal ($V_H$) and vertical ($V_D$) velocities.

$$t_N = \frac{(\lambda_k - \lambda_i)R}{V_H} \quad (25)$$

where R is the radius of the earth.

$$t_E = \frac{(\Lambda_k - \Lambda_i)R\cos(\lambda_i)}{V_H} \quad (26)$$

$$t_D = \frac{(h_k - h_i)}{V_D} \quad (27)$$

Berman and Powell conducted a statistical analysis by calculating the root mean square (rms) of the wind differences corresponding to various traveling time ranges. A function of wind difference rms with respect to traveling time was obtained. Berman and Powell found that a first order Markov process with 400 seconds correlation time and 5 m/sec variance modeled the wind velocity errors very well. The Berman-Powell statistical model is, therefore, used on-board the following aircraft to estimate the wind speed and direction at the wake-generating aircraft from the known wind speed and direction. As one skilled in the art would appreciate, the present invention is not limited by the use of the Berman-Powell statistical model and can be implemented to use any suitable statistical model that correlates well with the actual wind data. Moreover, as discussed herein, when advances in technology enable the on-board instrumentations such as sensors to be more accurate, reliable, and responsive in real time, the present invention can be implemented to obtain and utilize actual wind data.

Uncertainty in Calculating Wind On-board the Wake-Generating Aircraft

In some embodiments, the wind vector is calculated on-board the wake-generating aircraft by subtracting the true airspeed vector from the ground (GPS) velocity vector of the wake-generating aircraft. The true airspeed vector is then broadcasted for others to use. In a specific example, the true airspeed vector was measured on board a Saratoga by a Seagull Technology GIA 2000 AHRS (attitude heading reference system) with a resolution of 0.001 kts and $5.4933 \text{N}10^{-3}$. The ADS-B message was modified to include broadcast of the true airspeed vector of the Saratoga. The broadcast had an accuracy of ±1 kt and ±1°. The ground speed vector of the wake-generating aircraft was determined by the WAAS computer to an accuracy of ±0.81 kts with a broadcast resolution of ±1 kt and ±1°. This translates to an overall accuracy for true airspeed of ±1 kt and ±1° and for groundspeed of ±1.3 kts and ±1°.

As each wake plane was generated and displayed, the wind vector calculated at that place and time was attached to the wake plane. It was assumed that this wind vector remained unchanged for the life of that wake plane. Since the wake of an aircraft is embedded in the airmass into which it is generated, its horizontal movement is due to the movement of the airmass. With this in mind, the error in the location and movement of the wake is due solely to the change in the speed and direction of the airmass over time, the wind changes only as the airmass changes. What is required, then, is a model approximating how the wind varies with time.

After extensive literature searches and discussions with subject matter experts from the NOAA Flight Systems Lab, National Weather Service, Massachusetts Institute of Technology, and the Naval Post Graduate School, it appears that there are no statistical models for the change in the airmass (wind) over time, nor a source of data from which to create such a model. Data would have to be collected from a device that drifts with the airmass capable of measuring its own groundspeed while remaining at a constant altitude. Measurements would have to be taken for a range of days, altitudes, and geographic locations. In lieu of this, an estimated rms vector error derived from ACARS data, known as the Benjamin wind error model, is used herein to estimate the error in wind speed over time.

More specifically, to estimate the standard deviations of observation errors for wind and temperature, ACARS observations were collected over an area in the western and central U.S. for a 13-month period. This dataset was parsed for pairs of reports that were essentially collocated, within a small spatial and temporal window ($\leq 10$ km and $\leq 10$ min). Examining the differences between pairs of nearly collocated observations, one can estimate the observation error for a single platform (aircraft), since the spatial and temporal variability has for the most part presumably been removed.

Benjamin et al. calculated the rms differences between pairs of observations from aircraft with different tail numbers. These observations included contributions from observation error at both aircraft and mesoscale variability within the small separation. As in the Berman-Powell model, instrumentation and broadcast accuracies are already accounted for in the observation error. The error for an individual aircraft can be estimated using Equation 28, where $\sigma_{total}$ is the rms difference between two reports from different nearly collocated aircraft. If the assumption is made that the mesoscale variability is zero for small spatial and temporal separations, then the rms vector error for an individual aircraft can be estimated as $\sigma_{total}/\sqrt{2}$. This relationship assumes that there is no correlated error between reports from two different aircraft and that the expected error from each aircraft is equal.

$$\sigma_{total}^2 = \sigma_{a/c1}^2 + \sigma_{a/c2}^2 + 2\sigma_{meso}^2 \tag{28}$$

Table 16 illustrates the estimated rms vector error for winds from the ACARS observations. Using this data, a plot was generated for the estimated rms vector error with respect to the time separation. An error model was created by fitting a curve to the data in order to extend the data to other time frames. The Benjamin model was used to compare this error estimate to that of the Berman-Powell model. Using winds calculated on-board the wake-generating aircraft reduces the width of the predicted wake hazard area from 5070 ft (1542 m) with the Bernman-Powell error model to 2646 ft (806 m) with the Benjamin error model, a savings of over 2400 ft (731 m).

TABLE 16

| Time Separation (min) | Altitude Separation (m) | Average Altitude (m) | Distance (km) | Sample Size | Estimated rms Vector Error (m/s) | Rms Vector Difference (m/s) |
|---|---|---|---|---|---|---|
| 10 | 30 | 5163 | 10 | 60,265 | 2.4 | 3.4 |
| 5 | 0 | 4845 | 5 | 36,141 | 2.0 | 2.8 |
| 3 | 0 | 4265 | 2.5 | 12,138 | 1.9 | 2.7 |
| 2 | 0 | 3846 | 1.25 | 616 | 1.8 | 2.5 |

Figure 15:
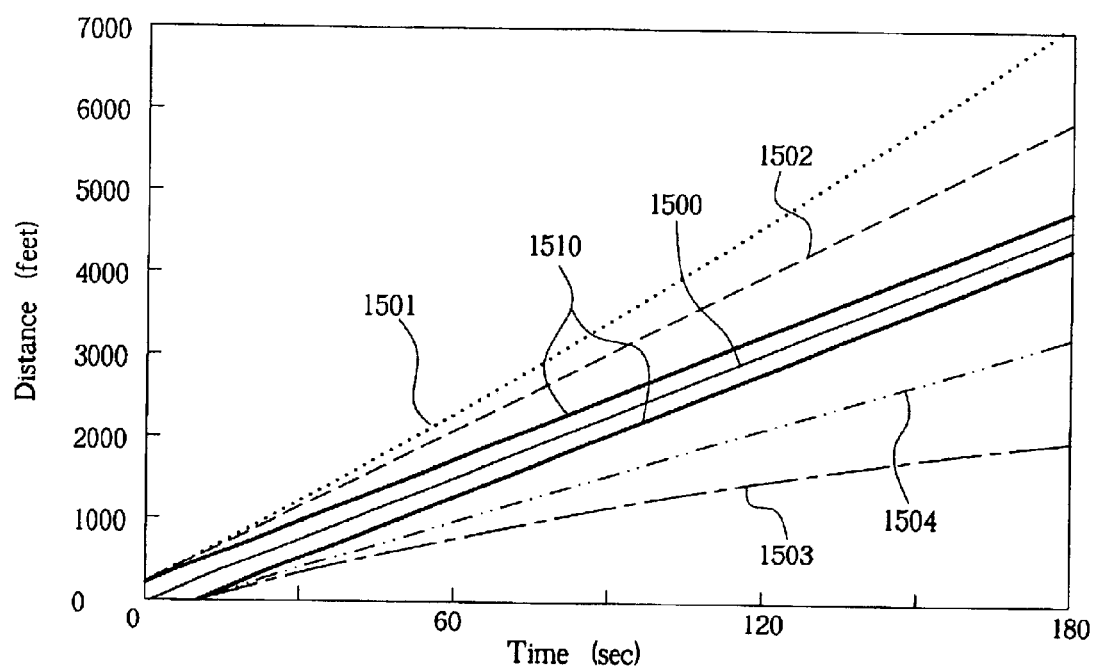
FIG. 15 illustrates extent of uncertainty in estimating winds at a wake-generating aircraft.

FIG. 15 illustrates the Benjamin model as compared to the Berman-Powell model, which shows the extent of the uncertainty in estimating, on-board the following aircraft, winds at a wake-generating aircraft. The wake-generating aircraft was on a ground track of 315 degrees and the wind is from 225 degrees (a direct crosswind to the flight path) at 15 kts. In FIG. 15, 1500 plots the nominal wake width, 1510 represents the nominal horizontal drift, 1501, 1503 respectively plots starboard and port errors per the Berman-Powell model, and 1502, 1504 respectively plots starboard and port errors per the Benjamin model.

The Wake Hazard Zone Model

Figure 16A:
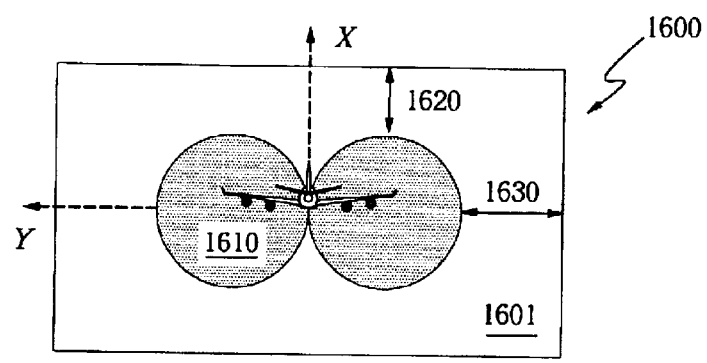
FIG. 16A is a cross-sectional view of the wake hazard zone exemplified in FIG. 10.

Conceptually, the wake hazard (no fly) zone model is comprised of the uncertainty and the nominal wake model discussed herein. According to an aspect of the present invention, the wake hazard or danger zone is defined as an area 1600 that encompasses the wake 1610, with a rolling moment coefficient of 0.01 or less, and its associated uncertainties 1620, 1630, as shown in FIG. 16A. 1620 represents vertical uncertainty over time due to generating aircraft parameters and 1630 represents horizontal uncertainty over time due to wind. Vertical uncertainty 1620 is on the order of 20–40% of $z_{w/g}$, depending on the type of aircraft and whether the nominal weight is based on MLW or GTW. The horizontal uncertainty 1630 is on the order of 2 m/s after 2–5 minutes and 2.4 m/s after 10 minutes. The cross-sections of the danger zone 1600 would then be modeled by having the nominal cross-section 1601 grow in size as a function of the uncertainty over time. When an individual wake plane is initially generated, it has the dimensions of the nominal cross-section 1601. In some embodiments, the nominal cross-section dimensions are $2b_g \times 1b_g$. After each time step the uncertainty over the elapsed time is added to the dimensions. Accordingly, the depth as well as the width of the danger zone 1600 would increase with time in two dimensions as illustrated in FIG. 16A.

Figure 16B:
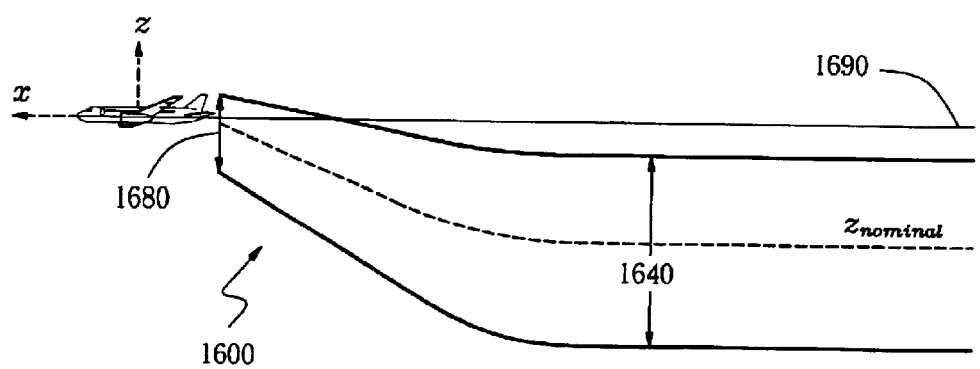
FIG. 16B is a side view of the wake hazard zone of FIG. 16A.

The danger zone 1600 will descend according to the nominal descent rate (Equation 6) and will level off at the nominal descent limit (Equation 7). FIG. 16B shows the uncertainty in the descent rate over time 1640 as well as the nominal wake depth 1680 and the flight path 1690. The uncertainty 1640 was used to calculate the increase in the depth of the wake plane over time. The uncertainty in the nominal descent limit is absorbed in the uncertainty 1640. The danger zone 1600 will remain at the altitude defined by the nominal descent limit $z_{nominal}$ until its lifespan has expired at which time the wake plane will disappear from the display.

Visualizing the Wake Hazard Zone on a 3-D Display

One of the greatest challenges to wake vortex avoidance is the ability of the pilot to maintain appropriate spatial orientation to neighboring aircraft and their wake. It is one thing to fully understand that if one maintains a flight path at or above the flight path of the preceding aircraft one will avoid encountering the wake, and completely another being able to do so, since there is no actual visual reference, especially when the preceding aircraft is climbing or descending. In this regard, a flight deck display that clearly indicates the vertical and horizontal spacing between the ownship and neighboring aircraft will enhance a pilot's situational awareness. What is more, a display that clearly and accurately indicates the spatial orientation to the neighboring aircraft's wake makes it possible for wake vortex encounters to be completely avoidable.

The introduction of GPS has made accurate navigation available worldwide and the fast moving computer and electronics technologies have made low cost receivers, airborne computers, and glass-cockpit displays available to every facet of the aviation community. Through differential GPS, the accuracy is now good enough to render the outside world, using readily available databases, such that it virtually matches the out-the-window view.

In some embodiments, the present invention is integrated with a 3-D perspective view Tunnel-in-the-Sky display developed by the Wide Area Augmentation System (WAAS) Laboratory at Stanford University (the integrated/enhanced display is hereinafter referred to as "the wake display" to distinguish from the original Tunnel-in-the Sky display). The Tunnel-in-the Sky display has been shown to be easy to fly and provide exceptional guidance, terrain and traffic awareness. It can be manufactured inexpensively, making it affordable not only to commercial carriers, but to general aviation as well. The Tunnel-in-the Sky display can mimic an out-the-window view, incorporating terrain and terrain alerting symbology. In some cases, the ADS-B technology is utilized to determine and show the position of neighboring aircraft. The present invention enhances the out-the-window view and hence the pilot's situational awareness with the ability to predict and visualize the wake vortices of airborne traffic. As one skilled in the art would appreciate, the wake vortex avoidance methodology, i.e., constructing an accurate and reliable wake hazard (danger) zone based on the nominal wake model and the uncertainty analysis according to the present invention, can be embodied in any suitable display device or synthetic vision, e.g., a display that is capable of providing visualization of the wake hazard zone in 2-D, 3-D, or 3-D perspective.

Synthetic Vision

The classic array of flight deck instrumentation used by flight crews to ascertain attitude, relative position, speed, and other information regarding the flight path and flight condition requires a well-trained and logical visual scan. This scanned information must be integrated into a mental image of the flight situation. Flight path displays differ appreciably from the classic system in their method of presenting this situational information. Flight path displays provide the flight crew with a perspective image, i.e., a synthetic vision, of the path to be flown, allowing them to accurately stay on course and avoid obstacles and hazards with much less mental processing and integration.

In addition, flight path displays provide command paths, which enable the flight crew to visually perceive relative orientation, closure, and flight progress. Research in human factors indicates the importance of aircraft orientation and motion perspective in helping the flight crew accomplish the flight tasks successfully. The inclusion of command flight path symbology enhances the pilot's perspective view of the present and intended path of travel, as well as, relative deviation from the command path, enabling the pilot to make better, more accurate control judgments. Numerous researchers have experimented with adding various hazards to the display, including traffic, obstructions, and weather, with the intent to enable the pilot to fly a path that would avoid the hazard. Unfortunately, with the exception of a select few, such as the Tunnel-in-the-Sky displays, academic research in flight path displays has been exclusively in simulation. On the other hand, much of the commercial display research has been in the area of Cockpit Display of Traffic Information (CDTI) and TCAS, which is limited to 2-D.

Human Factors

The continuous improvement in standard aircraft systems over recent years, both in terms of capability and reliability has helped to significantly reduce the occurrence of accidents due to both mechanical and electrical failure, resulting in an increase in the percentage attributed to pilot error. Awareness of one's surroundings lies at the heart of the human decision-making process and human performance. A high percentage of errors attributed to human operators actually occur as a result of errors in their situational awareness. In other words, the crew makes the right decision for their picture of the world, but their picture of the world is in error. This represents a fundamentally different category of problem than a decision error—in which the correct situation is comprehended, but a poor decision is made—and indicates a different type of solution. The purpose of synthetic vision is to provide the flight crew with better information/representation than is available from the out-the-window view in order to enhance their situational awareness. In essence, provide them with a tool to enable them to formulate the correct picture of the world.

Situational Awareness

Situational awareness (SA) is crucial for pilot performance in a dynamically changing environment and critical for controllers who must maintain a three-dimensional mental picture of rapidly changing aircraft locations. Over the last decade or so SA has received increasing attention and exposure. Yet, with all this attention, there is still no universally accepted definition. SA can be defined as knowing the aircraft position with respect to its operating environment or, more simply, knowing what's going on around oneself. The U.S. Air Force defines SA as the "continuous perception of self and aircraft in relation to the dynamic environment of flight, threats, and mission, and the ability to forecast, then execute tasks based upon that perception" [AFI 11-290]. This requires position and navigational awareness, which includes velocity, attitude, and flight path, in the present and future, as well as, environmental awareness, which includes traffic, terrain, weather, and other hazards and obstructions. At the level of perception, the flight crew reacts to what is happening around them. This is often referred to as being "behind" the aircraft (in their actions). At the level of comprehension, the crew understands what is going on and is able to interpret the meaning of these events. In other words, the crew is "with" the aircraft. The highest level of SA is projection. This level requires the flight crew to be pro-active by anticipating future events and necessary actions, as well as, the possible implications and consequences of these actions. Their actions must be "ahead" of the aircraft. For the purposes of the present invention, SA refers to the ability of the flight crew to maintain knowledge and comprehension of their surroundings, including positional, navigational, and environmental awareness. This includes the ability to identify traffic and wake-vortex hazards, to perceive their proximity to the wake, to interpret the level of threat posed by the presence of the wake, and to formulate and execute an action to avoid the threat.

Designing the Wake Display

Errors attributed to SA can be induced by many factors such as the design of the display system, which may include necessary information not being made available, information being presented poorly or in the wrong format, and ambiguous information. Moreover, studies have shown that pilots are significantly faster and fewer errors occurred using graphical display than using text-only or symbology-enhanced text display. Thus, better graphical display design improves SA and reduces operational errors. The present invention incorporates wake symbology in the display design that addresses the following issues:

The display system must free the pilot from the pressure of having to formulate a mental picture from information imparted intermittently.

The display system should enable easy, precise guidance.

The pilot should be able to freely choose the approach flight path if he sees the available space for maneuvering.

Symbology should (whenever possible) be applicable to all flight phases.

The display information should instill confidence in the pilot.

Operational Design Considerations

The first issue to consider was what the display should look like. This includes display symbology, what information, in addition to the wake, should be displayed, and what viewing perspective to use. The environment of interest, that in which the wake is located, is three-dimensional and would therefore be best represented in a format that provides 3-D knowledge. There are three ways to accomplish this: 1) one 2-D display that can be toggled through three views representing the plan view (top down view), side view, and forward view (line-of-sight view); 2) one 2-D display that provides all three views simultaneously or three separate displays, each providing one of the views; and 3) one display that provides a 3-D perspective view. While most flight deck displays on the market today are in a 2-D format, such as the CDTI and moving maps, it is believed that the 3-D perspective view provides a more realistic and useful format to the flight crew.

The disadvantage of a single display that toggles through the various views is that it requires additional thought and action on the part of the flight crew to obtain all of the required information. Toggling back and forth between views can also distract the flight crew from their primary task of flying the aircraft, add to their workload at a time when it is desired to reduce it, and adversely affect safety of flight. Displaying all three views simultaneously is an improvement, but still requires including all three views in the scan and mental interpretation between the views. The 3-D perspective view, on the other hand, provides the flight crew with the 3-D knowledge of the outside environment in an intuitive and comprehensive format. It should be noted that while previous Stanford research focused on the needs of GA, e.g., filling a void in GPS-based glass-cockpit navigational aids for GA aircraft, the wake display is equally applicable and necessary for all classes of aircraft. On the other hand, as discussed before, the present invention can be implemented with any suitable display device and is not limited to 3-D display format.

The next issue is the display symbology and what other information to include on the display. For the purpose of the present invention, the wake symbology and the range indicator must be included. The range indicator displays the vertical and horizontal distance between the ownship and neighboring aircraft. The wake symbology visualizes the wake hazard zone. The design of the wake symbology was a challenge, considering the 3-D format and other design issues such as human factors.

It seemed obvious at first to represent the wake hazard zone as two corkscrew like images, as this is how wake vortices are described. Figuring out how to estimate the varying location and size of such an image, track it, and code it, proved difficult. From a human factors point of view, such an image would have been a poor choice as it was a more complicated image than was necessary to convey the "danger, keep out" message to the flight crew. Since the wake symbology is not intended to represent the wake itself, but rather a wake hazard zone in where the wake lies, it should not necessarily look like a wake, but rather a volume representing a "no-fly zone." For this reason, rectangle or oval shapes are selected to represent cross-sectional slices or wake planes of a volume representing the height and width of the wake hazard zone. This would allow each wake plane to be independent of the others and migrate under its own set of equations of motion, enabling different portions of the wake hazard zone to drift at different rates depending on the ambient atmospheric conditions.

Display System Requirements

Another design issue relates to how to get the necessary information from the neighboring aircraft to the ownship to create a predicted wake hazard zone. While the TCAS message can be used to identify a neighboring aircraft and determine its position, The TCAS message does not carry enough of the necessary information. As discussed before, the ADS-B message contains almost all of the required information and alternative methods of determining or estimating the remaining information exist. Therefore, the wake display is preferably implemented with ADS-B at least for the purpose of receiving the necessary information, i.e., the broadcast, from the neighboring aircraft.

The display system must be small enough to fit into light GA aircraft. For the coverage to be complete all large and heavy class aircraft should be broadcasting. While most of the components that feed into the wake display are currently on-board virtually all commercial carriers, not all carriers are equipped with some of the technology such as ADS-B. Thus, the display system must also be affordable relative to the budget of a GA pilot, which is relatively small, as well as to commercial carriers who would have to retrofit the existing fleet in order to utilize the technology.

Display Elements

Figure 17:
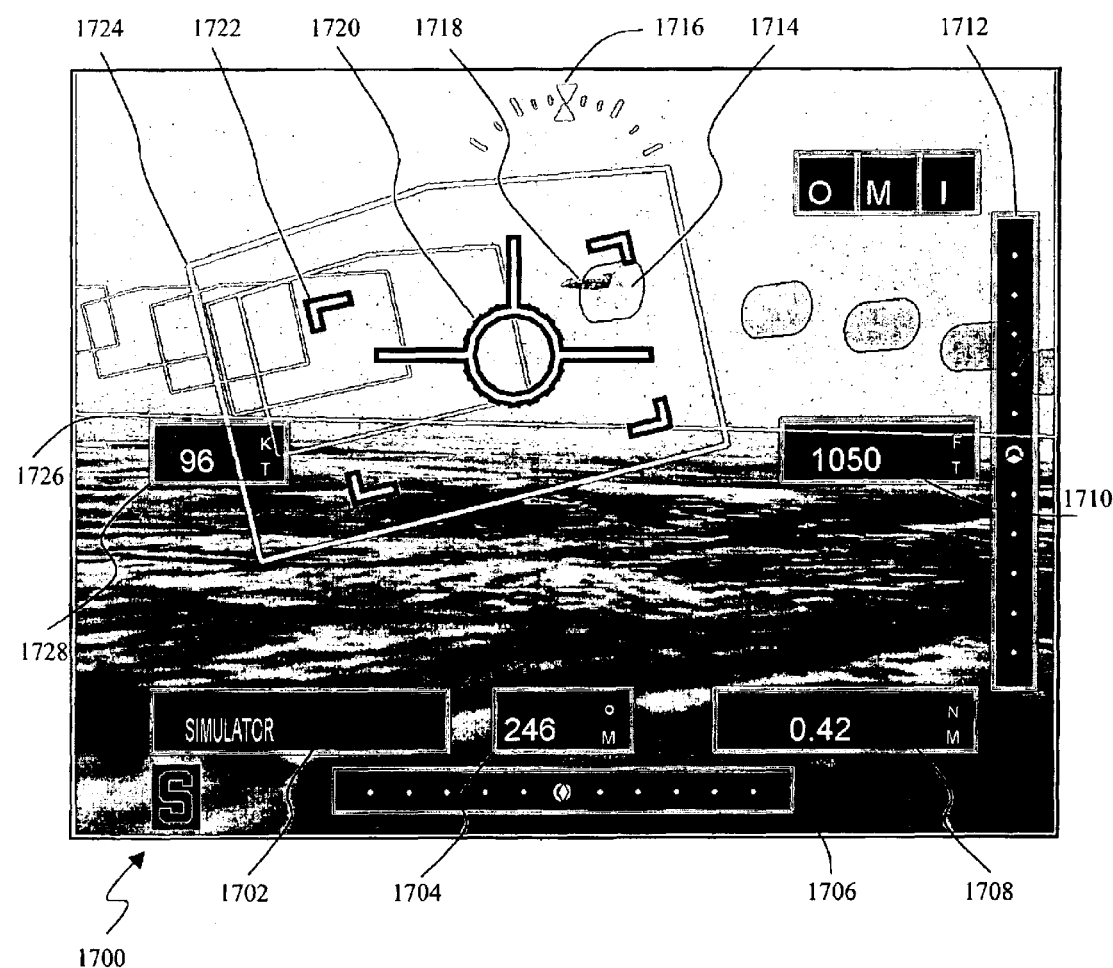
FIG. 17 illustrates wake visualization on a 3-D display in accordance with an embodiment of the present invention, the wake visualization includes a wake hazard zone.

FIG. 17 shows an exemplary display 1700 capable of dynamically and accurately predicting and visualizing a wake hazard zone according to the teachings of the present invention. Some indicators of the display 1700 replace or augment some of the standard flight deck instruments. For example, the standard heading indicator is replaced by a GPS derived magnetic heading indicator 1704, the artificial horizon is replaced by a roll (bank) indicator 1716, a horizon line 1726, and ground/sky, a window 1728 displays GPS derived ground speed which augments but does not replace the airspeed indicator, and a window 1710 that displays GPS altitude (AGL) which augments but does not replace the altitude indicator (MSL).

In this embodiment, the display 1700 integrates the Tunnel-in-the-Sky flight path elements for navigation, including a tunnel 1724, which guides the pilot along a pre-determined flight path; a nominal path indicator 1722, which helps the pilot to remain inside the tunnel 1724; a velocity predictor symbol 1720, which predicts the position of the ownship at some specified time in the future, usually 3.5 sec.; and horizontal and vertical deviation indicators 1706, 1712, respectively, which act like ILS needles to indicate the ownship's deviation from the tunnel 1724 and guide the pilot back accordingly. The distance to touch down (runway aimpoint) is derived from Differential GPS and displayed in window 1708. Position source indicator 1702 displays the source of position information, i.e., NSTB, Coast Guard Differential Corrections, simulator input, etc. In this case, the display 1700 operates in a simulation mode in which the tunnel 1724 is configured for a standard left hand traffic pattern for runway 32L at Moffett Field, Calif. The ownship is centered in the traffic pattern tunnel 1724 while another aircraft 1718 crosses overhead. The wake hazard zone of the traffic is shown as transparent oval shaped wake planes 1714 being deposited at one second intervals.

Operational Evaluation

In-flight tests were conducted to qualitatively evaluate and verify that the actual wake was located within the region designated as the hazard zone on the wake display, that the wake display enhances the situational awareness of the flight crew with respect to the location of the wake, and that the wake display enables the pilots to navigate to avoid the wake. The best possible means for evaluating the wake display of the present invention is to measure the location and drift of the actual wake and compare this to the location and dimensions of the predicted hazard zone. If the measurements lie within the dimensions of the hazard zone, then the prediction is accurate. However, as discussed herein, since the sensor technology is not mature enough to drive a wake display, there was no means available to record or measure the location of the actual wake, except visually. For testing purpose, the wake is made visible by outfitting the wake-generating aircraft with smoke generators on the wingtips and a triggering device in the aircraft cabin.

Figure 18:
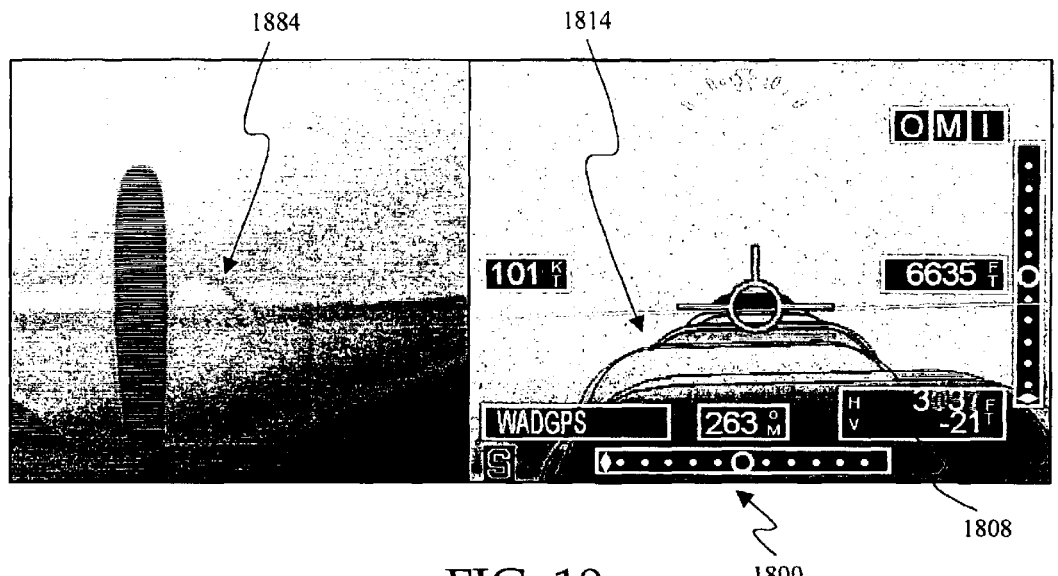
FIG. 18 is a side-by-side comparison between an out-the-window view and a synchronized realistic view of the wake visualization on a 3-D display.

FIG. 18 illustrates the scenario where the encountering (ownship) aircraft is in-trial of the wake-generating aircraft in the same air mass. On the left side of FIG. 18 is an actual out-the-window snap shot of wake smoke trail 1884. A digital video camera was mounted to the top of the encountering aircraft to record the forward view. The camera and lens were chosen such that the field of view recorded was approximately the same as the field of view of the wake display 1800. Two digital recording decks were mounted in the encountering aircraft and synchronized to GPS time. The set-up recorded what the pilot saw on the wake display 1800 and what was seen out-the-window at the same time so that the two scenes could be replayed side by side to verify that the predicted wake location 1814 coincided with the location of the actual wake. As can be seen in FIG. 18, there was excellent agreement between the out-the-window view on the left and the wake display 1800 view on the right, i.e., the wake was found to be inside the hazard zone as depicted on the display 1800. Note in FIG. 18, a range indicator 1808 indicates the horizontal and vertical distance between the ownship and neighboring/wake generating aircraft. A positive number indicates the ownship is behind and/or above the wake-generating aircraft. A negative number indicates the ownship is in front of and/or below the wake-generating aircraft. In FIG. 18, no tunnel is used to provide navigation guidance.

Figure 19:
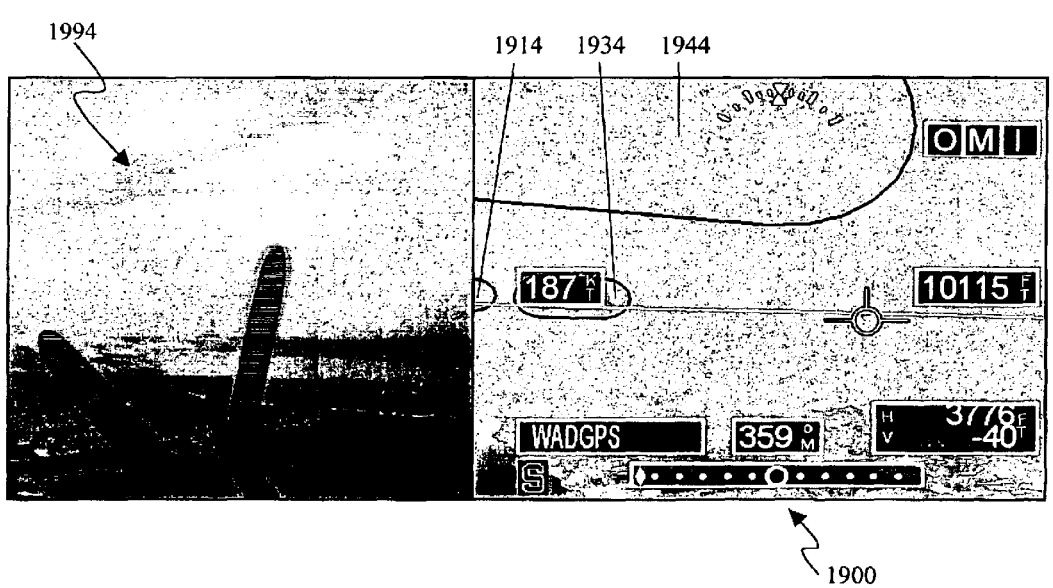
FIG. 19 is another side-by-side comparison between an out-the-window view and a synchronized realistic view of the wake visualization on a 3-D display.

FIG. 19 illustrates the scenario where the encountering aircraft crosses the flight path of the wake-generating aircraft. The wake smoke trail 1994 can be seen in the out-the-window view on the left. The wake display 1900 on the right shows transparent oval shapes 1914, 1934, 1944 representing cross-sectional wake planes that should be avoided. Again, there was excellent agreement between the out-the-window view on the left and the wake display 1900 view on the right.

The pilots reported an improved awareness of the relationship between the wake, the wake-generating aircraft, its flight path, and their own aircraft. During maneuvers when it was difficult to locate the lead aircraft out the window, the display could be used to follow the wake trail to the aircraft. Then looking out the window in the direction indicated on the display, the other aircraft could be visually acquired. Using the display the pilots had no difficulty maneuvering to avoid the wake and had no difficulty in finding the wake when that was the objective.

Although the present invention and its advantages have been described in detail, it should be understood that the present invention is not limited to or defined by what is shown or described herein. Known methods, systems, or components may be discussed without giving details, so to avoid obscuring the principles of the invention. As it will be appreciated by one of ordinary skill in the art, various changes, substitutions, and alternations could be made or otherwise implemented without departing from the principles of the present invention.

For example, changes in the ADS-B architecture may enable appropriate modification to the structure of the ADS-B message instead of overwriting data to existing data blocks. Such changes would improve the integrity of the data stream and enhances the performance of the wake display. Alternatively, it is foreseeable that the present invention can be implemented to acquire access to the necessary data not included in the original message structure. Software filter could be used to smooth out or otherwise improve the appearance of the displayed wake trail. Moreover, combining a dynamically moving tunnel with the wake display could enable the tunnel to provide navigation guidance to avoid a wake encounter. It is feasible to incorporate terrain, traffic, navigation aids, and/or other communication devices into the display device, thus providing a comprehensive out-the-window view type of navigation, collision avoidance, and wake avoidance display. Note if the same hazard information is displayed to pilots and controllers, advisories and collaboration over avoidance maneuvers could be based on a shared situational awareness, which has been shown to reduce operational errors.

The present invention could be implemented with an actual 3-D display in which portions of the graphical view are projected onto one display surface and other portions of the graphical view are projected on a second display surface located behind the first one. That is, a user looks through the first surface to see the second one. This type of display has the capacity to provide up to 50 surfaces. With varying degrees of transparency, a truly 3-D image is presented.

The wake display and associated system components could be implemented in a hand held or portable device, as well as HUD technology. Alternatively, they can be implemented in an ATC facility whereby controllers could see the wake turbulence of the traffic under their control and could issue wake turbulence advisories based on the information provided. Ground vehicles that operate in the airport and runway environment could also benefit from the present invention since they would be able to safely maneuver in areas where wake turbulence has descended.

When sensor technology matures to the point where a robust, reliable, all weather sensor is available to detect wake turbulence far enough in advance for a pilot to plan an alternate flight path, such sensor could easily be incorporated into the inventive system. The present invention could then be implemented to utilize real-time detection of wake turbulence and other atmospheric disturbances, such as wind shear and clear air turbulence, instead of a prediction.

Accordingly, the scope of the invention should be determined by the following claims and their legal equivalents.

We claim:

1. A method for dynamic wake prediction and visualization comprising the steps of:
    obtaining aircraft data and atmospheric data continuously in essentially real time;
    extracting parameters from said aircraft data and said atmospheric data;
    determining a nominal wake model with said parameters;
    analyzing said nominal wake model to determine uncertainty;
    predicting a wake hazard zone with minimal uncertainty by adjusting sizes of said wake hazard zone in accordance with said analyzing step; and
    visualizing a location of said wake hazard zone.

2. The method according to claim 1, in which
    said wake hazard zone comprises a series of two-dimensional wake planes, each of which is subject to its own sink rate and wind vector as measured at a particular point in time and each moves independent to another.

3. The method according to claim 2, in which
    said predicting step further comprises the step of increasing a size of one of said two dimensional wake planes in a horizontal direction, a vertical direction, or both.

4. The method according to claim 2, in which
    said visualizing step further comprising depositing said wake planes at a predetermined time interval.

5. The method according to claim 2, in which
    each of said wake planes increases in size in two directions as it ages.

6. The method according to claim 1, in which
    said visualizing step further comprises the step of visualizing width, height, and depth of said wake hazard zone on a display.

7. The method according to claim 1, further comprising:
    determining a lifespan of a wake generated by said aircraft; and
    discontinuing said visualizing step when said lifespan ends.

8. The method according to claim 1, in which
    said uncertainty includes spatial uncertainty and temporal uncertainty.

9. The method according to claim 1, in which sources of said uncertainty include time, location, weight, load factor, sink rate, wake vortex span, wake lifespan, wind direction, wind speed, air density, lateral draft, horizontal drift, and instrumentation error.

10. The method according to claim 1, in which said aircraft data and said atmospheric data are embedded in a wireless datalink message.

11. The method according to claim 10, in which said wireless datalink message is an automatic dependent surveillance broadcast (ADS-B) message or a traffic collision avoidance system (TCAS) mode-S message.

12. The method according to claim 1, in which said parameters comprising said aircraft's position, said aircraft's weight, said aircraft's wingspan, said aircraft's ground velocity vector, said aircraft's true airspeed vector, wind vector, and air density.

13. The method according to claim 1, further comprising:

displaying said aircraft and indicating vertical and horizontal distances to said aircraft.

14. The method according to claim 1, further comprising:

indicating wind speed and direction at said aircraft, ownship, or both.

15. A dynamic wake avoidance system comprising:

wireless communication means for receiving aircraft data including identification, configuration, position, and weight, and atmospheric data including wind speed and air density;

processing means for extracting parameters from said aircraft data and said atmospheric data, for modeling a nominal wake vortex with said parameters, for analyzing said nominal wake model to determine uncertainty, and for determining a resulting wake hazard zone with minimal uncertainty; and display means for visualizing a location of said wake hazard zone.

16. The system according to claim 15, in which said wake hazard zone is characterized as having width, height, and depth; and said uncertainty includes spatial uncertainty and temporal uncertainty.

17. The system according to claim 15, further comprising:

means for determining said position via global positioning satellite system (GPS), local area augmentation system (LAAS), wide area augmentation system (WAAS), traffic collision avoidance system (TCAS), or inertial navigation systems (INS).

18. The system according to claim 15, in which said wireless communication means include an automatic dependent surveillance broadcast (ADS-B) datalink.

19. The system according to claim 15, in which said processing means include
means for modeling and predicting location, movement, and lifespan of said wake hazard zone, said movement including vertical drift and horizontal drift.

20. The system according to claim 15, in which said display means is capable of rendering a three-dimensional (3-D) out-the-window view and includes a range indicator.

21. The system according to claim 15, in which said display means is capable of providing a synthetic vision of said wake hazard zone.

22. The system according to claim 15, in which said wireless communication means, said processing means, and said display means are integrated with a computer located onboard an airborne vehicle, a ground vehicle, a marine vehicle, or in an air traffic control (ATC) facility.

* * * * *